United States Patent [19]

Olnowich et al.

[11] Patent Number: 5,680,402
[45] Date of Patent: Oct. 21, 1997

[54] PRIORITY BROADCAST AND MULTI-CAST FOR UNBUFFERED MULTI-STAGE NETWORKS

[75] Inventors: Howard Thomas Olnowich, Endwell; Thomas Norman Barker, Vestal; Peter Michael Kogge; Gilbert Clyde Vandling, III, both of Endicott, all of N.Y.

[73] Assignee: International Business Machines Corporation, Armonk, N.Y.

[21] Appl. No.: 318,578

[22] Filed: Oct. 5, 1994

Related U.S. Application Data

[63] Continuation-in-part of Ser. No. 677,543, Mar. 29, 1991, and Ser. No. 748,316, Aug. 21, 1991, Pat. No. 5,404,461.

[51] Int. Cl.$^6$ .................................................. H04Q 11/04
[52] U.S. Cl. ................. 370/498; 370/388; 370/389; 370/455; 340/825.51; 340/825.8
[58] Field of Search ..................... 370/53, 58.1, 58.2, 370/58.3, 60, 67, 68.1, 85.3, 85.6, 93, 94.1, 351, 498, 422, 375, 445, 390, 389, 392, 455; 379/161, 208; 455/53.1; 340/825.5, 825.51, 825.8; 395/325

[56] References Cited

U.S. PATENT DOCUMENTS

| | | | |
|---|---|---|---|
| 4,078,228 | 3/1978 | Miyazaki | 370/85.6 |
| 4,701,906 | 10/1987 | Ransom et al. | 370/60 |

(List continued on next page.)

FOREIGN PATENT DOCUMENTS

| | | |
|---|---|---|
| 8700373 | 1/1987 | WIPO . |
| 8702155 | 4/1987 | WIPO . |

OTHER PUBLICATIONS

IBM TDB, vol. 30, No. 1, Jun. 1987, pp. 72–78 "Poll Actuated Multiple Access Technique for Broadgath . . . ".
IBM TDB, vol. 22, No. 12, May 1980, pp. 5450–5052 "Distributed Star Network with Unrooted Tree Topology".
Seventh Annual Joint Conference of the IEEE Computer and Communications Societies, Mar. 1988, "The Architecture of a Multicast Broadband Packet Switch", pp. 1–8, by T. T. Lee et al.
IBM Technical Disclosure Bulletin, vol. 34, No. 8, Jan. 1992, "XNL Switch And Its Control", published anonymously.
IBM TDB vol. 33, No. 5, Oct., 1990, "Asynchronous Digital Video Switching System", by Farrell et al, pp. 227–233.
H. S. Stone, 'Priority–Resolution Mechism for Reducing Collisions in a multi–processor Interconnection Network.' IBM Technical Disclosure Bulletin vol. 32 No. 4A (1989) 338–341.

*Primary Examiner*—Douglas W. Olms
*Assistant Examiner*—Shick Hom
*Attorney, Agent, or Firm*—Michele A. Mobley; Jenkens & Gilchrist; Eugene I. Shkurko

[57] ABSTRACT

A dual priority switching apparatus for making input port to output port connections on a requested basis quickly and dynamically, in a standard mode from any one of the input ports to a fixed number of subsets of multiple output ports simultaneously, or in a broadcast mode from any one of the input ports to all output ports simultaneously. The apparatus permits multiple broadcasts to be queued at the individual switching apparatus which resolves the broadcast contention on a synchronous priority driven basis that permits one broadcast to follow the other at the earliest possible moment and the quickest possible speed. The apparatus permits multiple multi-cast operations to occur simultaneously within the network. The multi-cast function permits subsets of nodes assigned to the same tasks to communicate among themselves without involving other nodes that are not in its own subset. Hardware circuitry detects and corrects deadlock conditions in the multi-stage network. The hardware circuitry detects all the different types of deadlock conditions automatically and issues correction indications to the network paths involved. The network deadlock is thereby eliminated, and the two broadcasts or multi-casts involved continue their operation in a rearranged sequence that will not cause deadlock.

5 Claims, 20 Drawing Sheets

U.S. PATENT DOCUMENTS

| | | | |
|---|---|---|---|
| 4,706,080 | 11/1987 | Sincoskie | 340/825 |
| 4,707,853 | 11/1987 | Hasegawa | 340/825.51 |
| 4,754,395 | 6/1988 | Weisshaar et al. | 364/200 |
| 4,766,592 | 8/1988 | Baral et al. | 370/62 |
| 4,815,105 | 3/1989 | Bottoms et al. | 375/37 |
| 4,818,984 | 4/1989 | Chang et al. | 340/825.5 |
| 4,835,674 | 5/1989 | Collins et al. | 364/200 |
| 4,855,899 | 8/1989 | Presant | 364/200 |
| 4,897,834 | 1/1990 | Peterson et al. | 370/85.1 |
| 4,926,375 | 5/1990 | Mercer et al. | 364/900 |
| 4,935,866 | 6/1990 | Sauvajol et al. | 364/200 |
| 4,941,084 | 7/1990 | Terada et al. | 364/200 |
| 4,956,772 | 9/1990 | Neches | 364/200 |
| 4,965,788 | 10/1990 | Newman | 370/60 |
| 5,007,052 | 4/1991 | Flammer | 370/94.3 |
| 5,033,108 | 7/1991 | Lockwood | 455/103 |
| 5,157,654 | 10/1992 | Cisneros | 370/94.1 |
| 5,189,665 | 2/1993 | Niehaus et al. | 370/58.1 |
| 5,250,943 | 10/1993 | Childs et al. | 340/825.8 |
| 5,303,383 | 4/1994 | Neches et al. | 370/58.1 |
| 5,365,228 | 11/1994 | Childs et al. | 340/825.8 |
| 5,404,461 | 4/1995 | Olnowich et al. | 395/325 |
| 5,440,549 | 8/1995 | Min et al. | 370/60 |

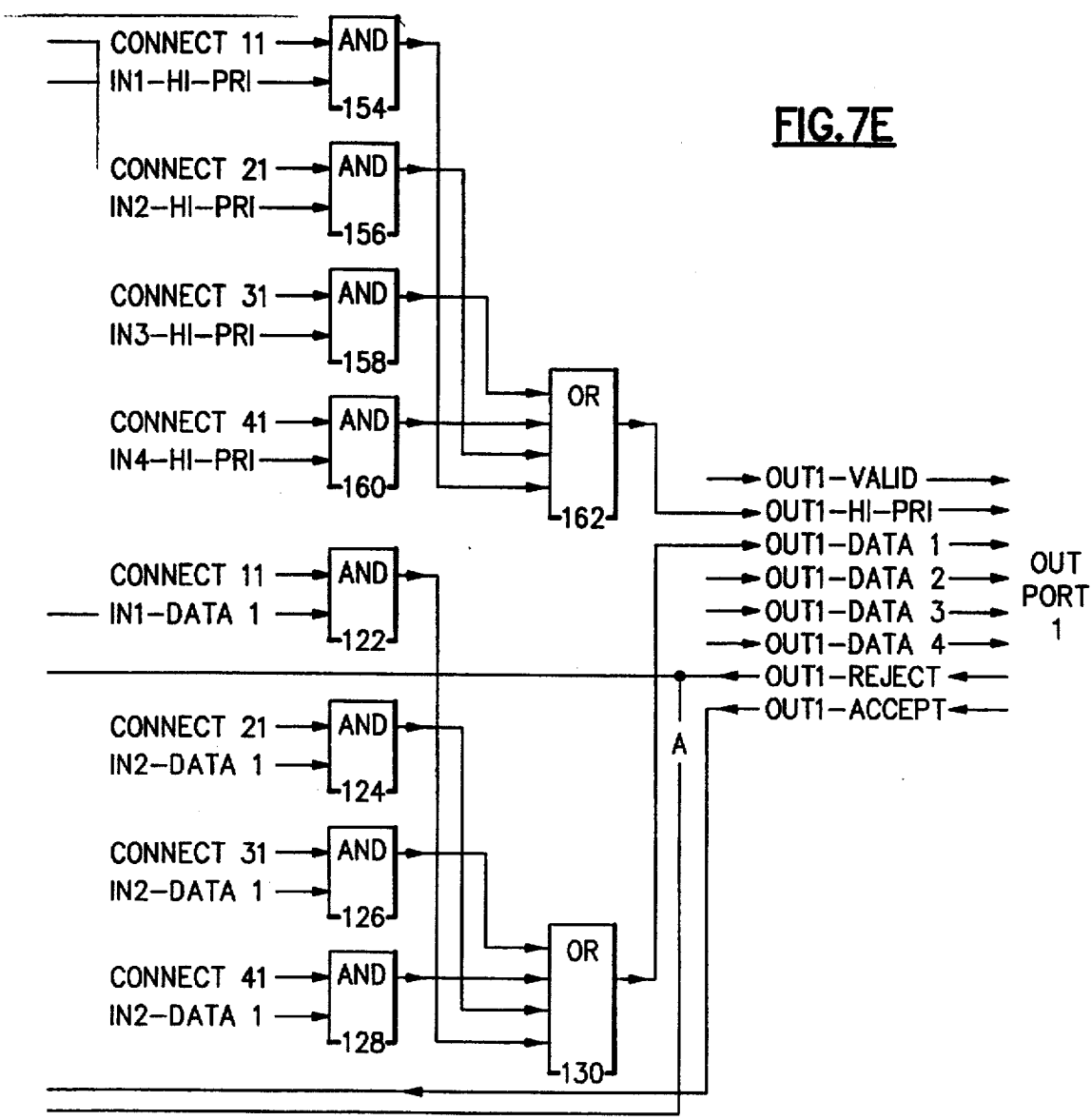

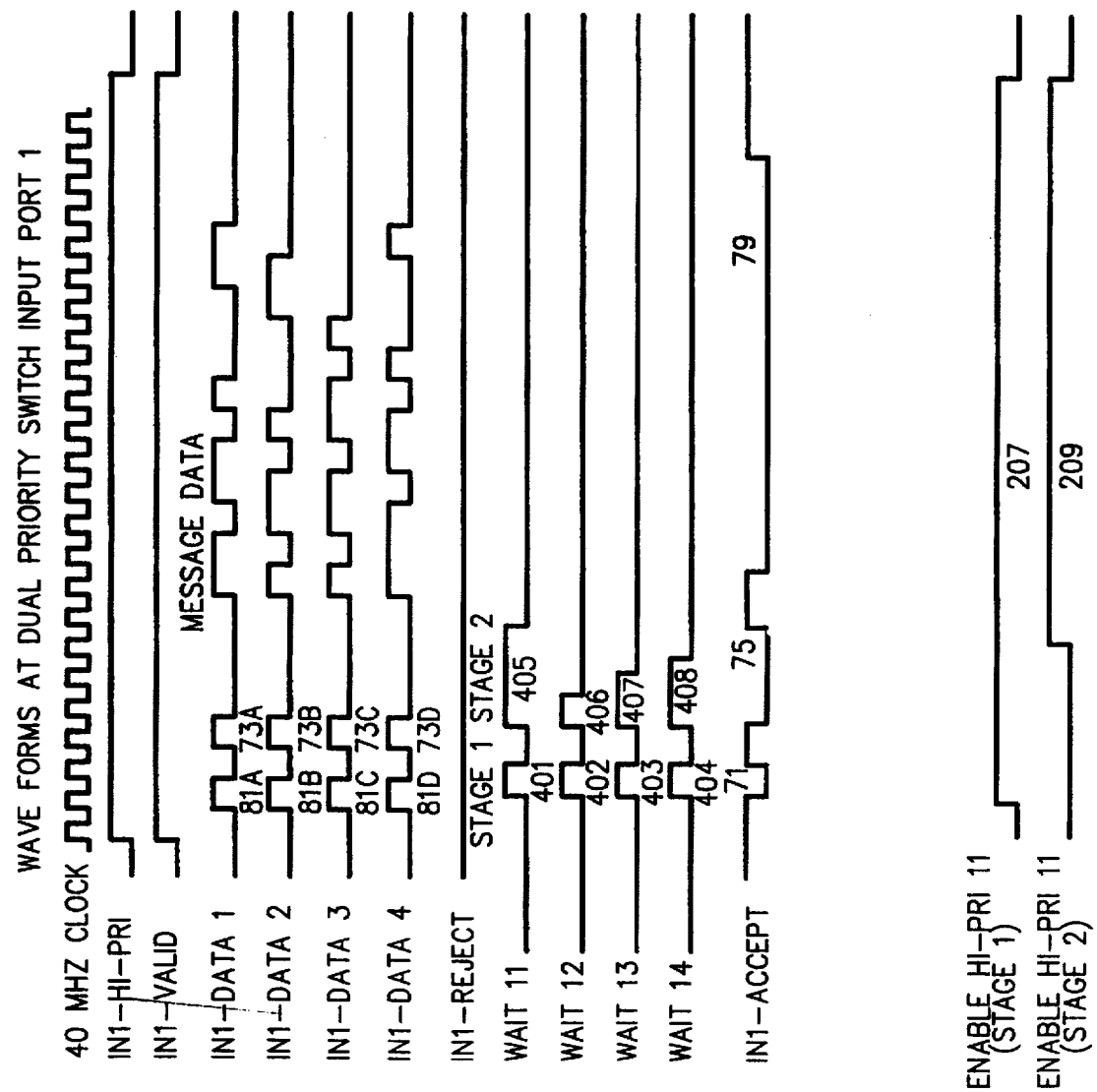

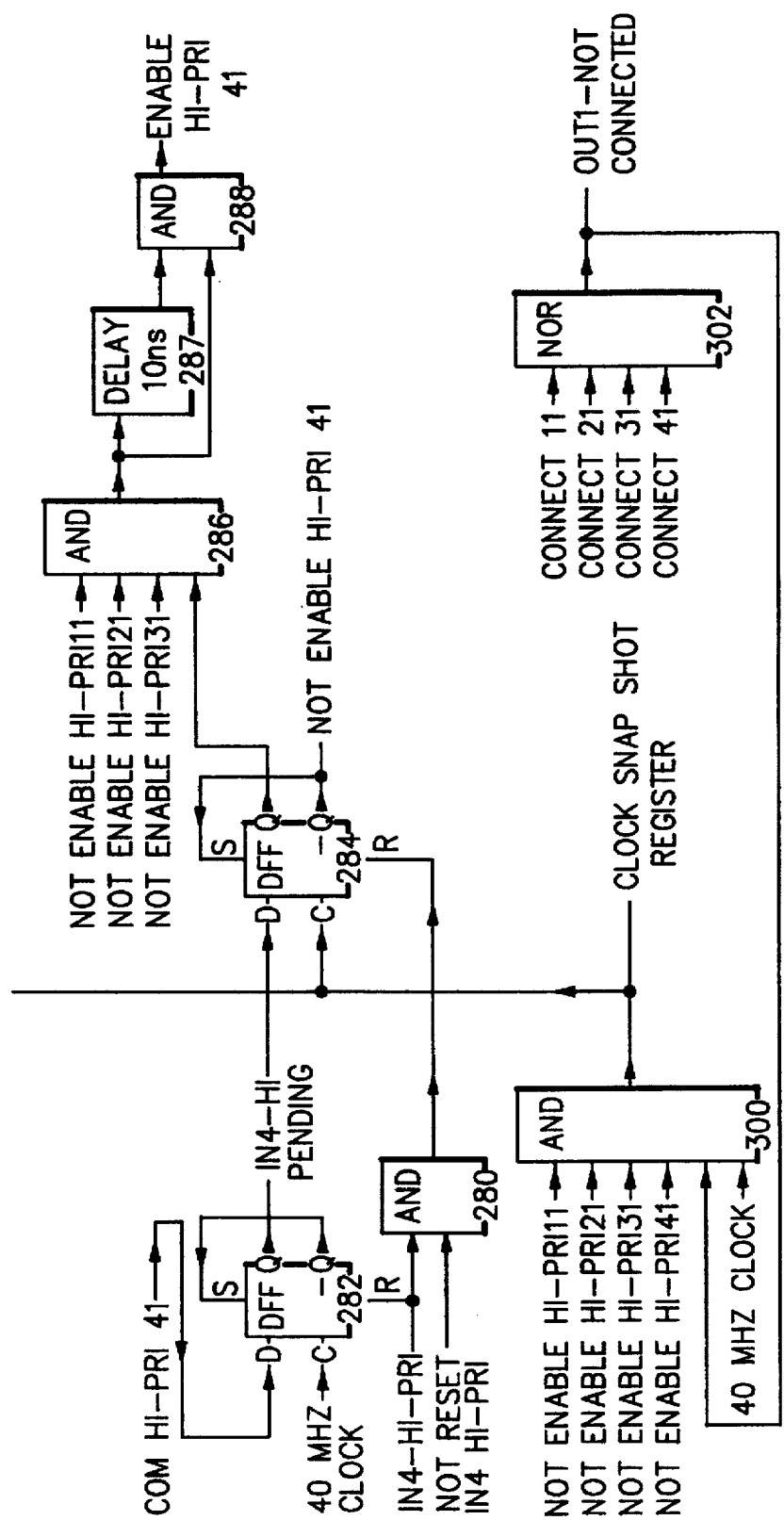

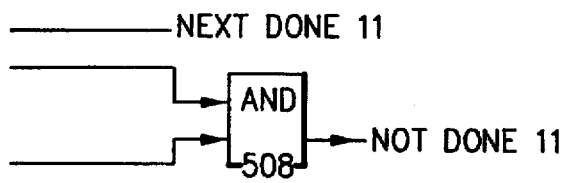
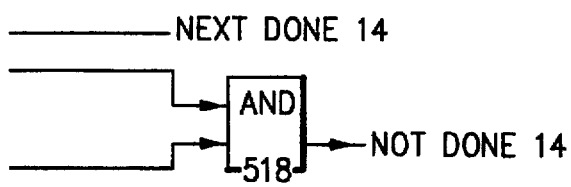
FIG.13B
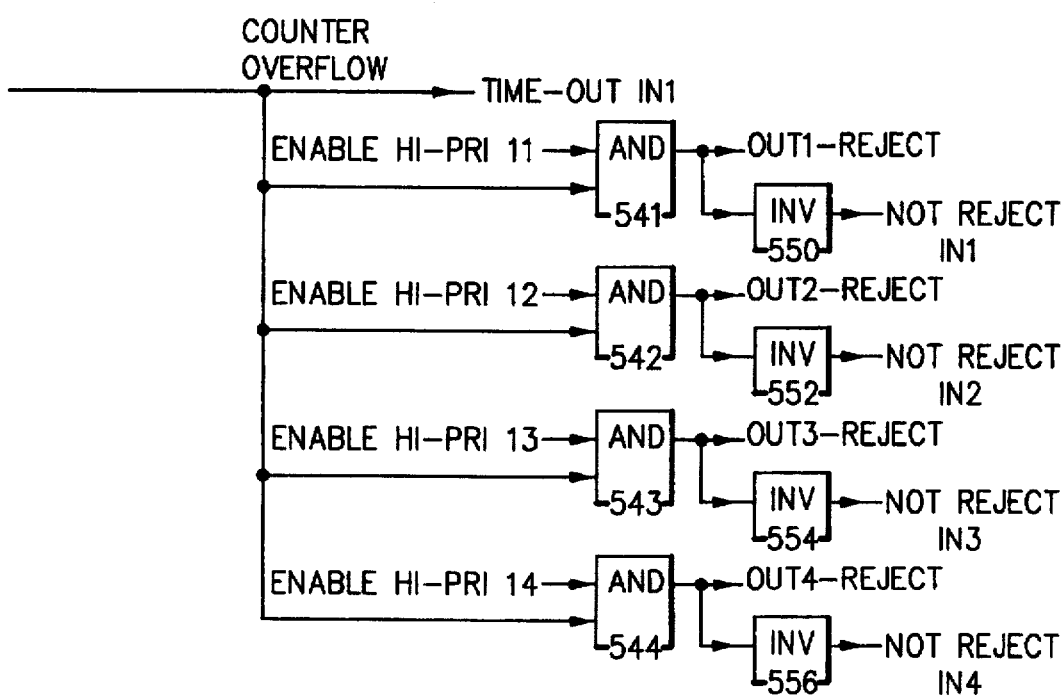

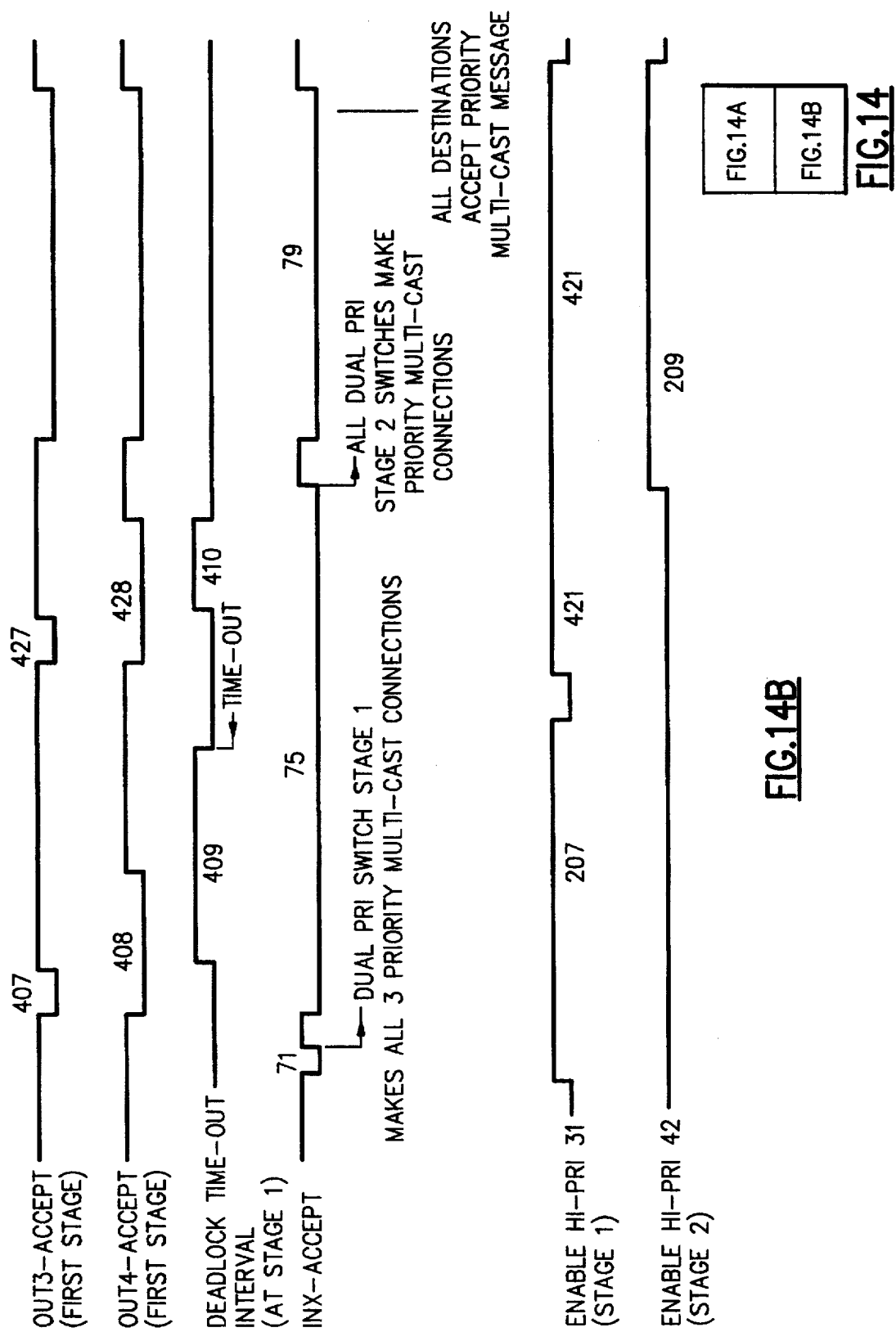

PRIORITY BROADCAST AND MULTI-CAST FOR UNBUFFERED MULTI-STAGE NETWORKS

CROSS REFERENCE TO RELATED APPLICATIONS

This application is a continuation-in-part of U.S. Ser. No. 07/677,543, filed Mar. 29, 1991 by P. A. Franasek, et al., entitled "All-Node Switch, An Unlocked, Unbuffered Asynchronous Switching Apparatus" now continued as U.S. Ser. No. 08/457,789; and of U.S. Ser. No. 07/748,316 entitled "Broadcast/Switching Apparatus For Executing Broadcast/Multi-Cast Transfer Over Unbuffered Asynchronous Switching Networks" by H. T. Olnowich, et al, filed Aug. 21, 1991, now issued as U.S. Pat. No. 5,404,461.

The present application is related to the following:

U.S. Ser. No. 07/659,199; "Asynchronous Low Latency Data Recovery Apparatus and Method" by Betts, et al, filed Feb. 22, 1991, now issued as U.S. Pat. No. 5,610,953;

U.S. Ser. No. 07/748,303; "Sync-Net—A Barrier Synchronization Apparatus For Multi-Stage Networks" by P. L. Childs, et al, filed Aug. 21, 1991, now issued as U.S. Pat. No. 5,365,228;

U.S. Pat. No. 07/748,295; "GVT-Net—A Global Virtual Time Calculation Apparatus For Multi-Stage Networks" by P. L. Childs, et al, filed Aug. 21,1991, now issued as U.S. Pat. No. 5,250,943;

U.S. Pat. No. 07/799,497; "Multi-Function Network" by H. T. Olnowich, et al, filed Nov. 27, 1991; Issue Fee paid Mar. 20, 1997; Awaiting Issue Notification; and U.S. Pat. No. 07/748,302; "Multi-Sender/Switching Apparatus For Status Reporting Over Unbuffered Asynchronous Multi-Stage Networks" by H. T. Olnowich, et al, filed Aug. 21, 1991

FIELD OF THE INVENTIONS

This invention relates to unbufferd multi-stage switching networks, and particularly to byte-wide parallel hardware using parallel crossbar switches for a byte parallel multi-sized interface switch for broadcasting and multi-casting over multi-staged switching networks using a special high priority implementation that allows broadcast and multi-cast functions to be transmitted over the same simplex network used for normal message transmission.

BACKGROUND OF THE INVENTIONS

In the patent literature, there are many patents which deal with broadcast mechanisms. Some broadcast mechanisms are not implemented by hardware. For instance, U.S. Pat. No. 4,818,984 to S. J. Chang et al. issued on Apr. 4, 1989 describes a broadcast mechanism implemented in software.

Switching networks are different from busses and local area networks (LANs). For instance, it would be recognized that U.S. Pat. No. 4,926,375 to F. L. Mercer et al. issued on May 15, 1990 relates to a broadcast mechanism implemented over a multi-drop bus. U.S. Pat. No. 4,706,080 to W. D. Sincoskie issued on Nov. 10, 1987 describes a broadcast mechanism implemented over several multi-drop busses; as does U.S. Pat. No. 4,855,899 to S. D. Presant issued on Aug. 8, 1989; as also does the publication by IBM in the TECHNICAL DISCLOSURE BULLETIN, IBM TDB Vol. 30, No. 1, 6/87 pg 72–78, POLL ACTUATED MULTIPLE ACCESS TECHNIQUE FOR BROADGATHERING SYSTEMS.

There are several patents which describe broadcast mechanisms for LANs. U.S. Pat. No. 4,754,395 to B. P. Weisshaar et al. issued on Jun. 28, 1988 describes a broadcast mechanism implemented over a serial, loop-connected LAN. U.S. Pat. No. 4,835,674 to R. M. Collins et al. issued on May 30, 1989 describes a broadcast mechanism implemented over multi-drop busses tied to LANs and broadcasting over the entire set-up.

Some broadcast mechanisms are designed for synchronized multiplexed time slot, bit oriented networks, as represented by U.S. Pat. No. 4,897,834 to J. R. Peterson et al. issued on Jan. 30, 1990 and others, such as U.S. Pat. No. 4,766,592 to E. Baral et al. issued on Aug. 23, 1988 describe a broadcast mechanism implemented over a synchronized, multiplexed time slot, telephone line hook-up. IBM TDB Vol. 22, No. 12, 5/80 pg 5450–52, DISTRIBUTED STAR NETWORK WITH UNROOTED TREE TOPOLOGY describes a broadcast mechanism implemented over an unrooted tree network which uses synchronous transmissions and packet switching.

Other mechanisms are designed for transmission lines. U.S. Pat. No. 4,935,866 to R. Sauvajol et al. issued on Jun. 19, 1990 describes a broadcast mechanism implemented over a synchronous, transmission line, communication link. U.S. Pat. No. 4,941,084 to M. Terada et al. issued on Jul. 10, 1990 describes a broadcast mechanism implemented over a transmission line, loop interconnect arrangement. U.S. Pat. No. 4,815,105 to S. Bottoms et al. issued on Mar. 21, 1989 describes a broadcast mechanism implemented over a transmission line, telephone line type interconnect arrangement. While telephone switches have employed crossbar switches, generally they do not use parallel connect crossbar switches.

Some prior work related to multi-stage switching networks has also been developed. U.S. Pat. No. 4,956,772 to P. M. Neches issued on Sep. 11, 1990 provided a buffered packet synchronous switch. This complex single serial interface line switch requires data recovery capabilities. It needs a complex priority determination built into each switch stage, and brings the broadcast command bits into the switch serially. Another packet switch which relates to a multistage switching network is U.S. Pat. No. 4,701,906 to M. N. Ransom et al. issued on Oct. 20, 1987. It also is a buffered synchronous packet switch, and provides for a handshaking interface. It brings the broadcast command bits into the switch serially, and the complex switch also requires data recovery capabilities. It is a single serial interface, and appears not to have considered the need for an asynchronous byte-wide parallel interface for broadcast applications.

Broadcasting a message from one device to N devices through a multi-stage network composed of BUFFERED switching devices is a relatively simple task: at each switch the message is fanned-out to all the switch outputs by inserting it into a queue (ordered buffer) associated with each output. The transmitter of the broadcast message does not have to concern itself with contention at each switch output (i.e., the output being busy transmitting previously initiated messages). If the output is busy, the broadcast message merely goes into a queue of messages waiting to use the output and eventually will get its turn and the broadcast message will propagate slowly through the network. However, there are 3 drawbacks to using buffered networks: they are usually relatively slow; there is the problem of not knowing when the broadcast will arrive and certainly it will arrive at vastly different times at the various receiving devices; and buffered networks usually require synchronization across all transmitting and receiving devices as well as the network switches themselves. Synchronous systems are finding it more and more difficult to meet the ever-increasing communication demands of modern parallel processing systems; they are just not fast enough to keep pace with the rapidly increasing computer clock rates and thus they are becoming a high risk problem.

On the contrary, UNBUFFERED asynchronous networks can provide greatly improved speed at a much lower complexity, risk and cost. However, one of the problems usually inherent with unbuffered networks is that they cannot BROADCAST messages (i.e. send messages over the switching network from one device to all the devices attached to the network).

SUMMARY OF THE INVENTION.

The present invention provides a solution applicable to performing both broadcast and multi-cast transfers over switching networks, in addition and inter-mixed with the single transfers normally supported by the said networks. In particular, the disclosure applies to byte-wide parallel hardware using parallel crossbar switches for a byte parallel multi-sized interface switch for communicating over multi-staged switching networks. This solution provides the usual advantages of broadcast and multi-cast operations through an unbuffered network, and gives a far superior broadcast capability in comparison to buffered networks in that the broadcast message propagates quickly and arrives simultaneously at all receiving devices. In addition, the present invention permits multiple broadcasts to be queued at the switching apparatus and resolves the broadcast contention on a synchronous priority driven basis that permits one broadcast to follow the other at the earliest possible moment and the quickest possible speed. In addition, the present invention permits multiple multi-cast operations to occur simultaneously within the network.

These features and other improvements are detailed in the following description. For a better understanding of the inventions, together with related features, reference may be made to the previous ALL-NODE switch, unclocked broadcast, and dual priority switch applications for some additional detailed background. Further, specifically as to the improvements described herein, reference should be made to the following description and the associated drawings.

BRIEF DESCRIPTION OF THE DRAWINGS

FIGS. 7A–7E illustrates our preferred embodiment of the dual priority switch as used to perform priority broadcasts and multi-casts by showing a typical implementation of high and low priority paths between a given input port and a given output port of the dual priority switch. Also illustrated is the unique deadlock detection and correction logic which is required to perform the priority broadcast and multi-cast operations.

FIG. 8 is a timing diagram, which shows a typical example of how high priority broadcast and multi-cast paths are established sequentially at the first available instant through a two stage network comprised of dual priority switches.

FIGS. 9A–B shows the detailed logic of the high priority function, which includes the snapshot register, register clocking, and high priority pending logic.

FIGS. 13A–B shows the detailed logic for detecting and correcting deadlock type 2 conditions.

FIGS. 14A–B is a timing diagram, which shows a typical example of how deadlock type 2 conditions are detected, corrected, and how the transfer proceeds after the correction.

DETAILED DESCRIPTION OF THE INVENTIONS

Figure 1:
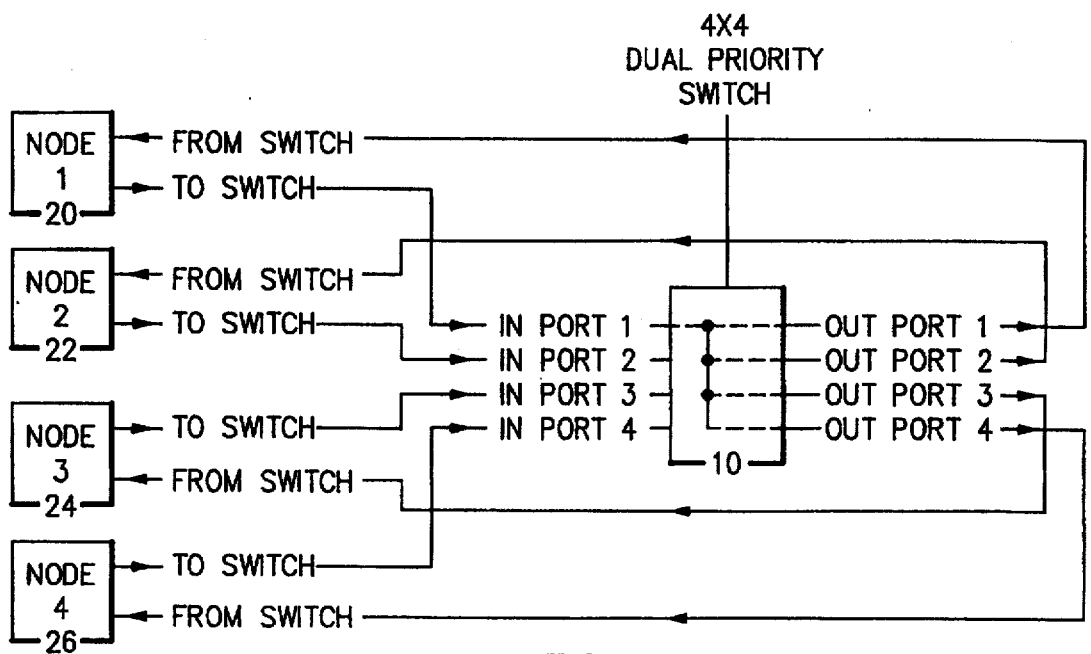
FIG. 1 illustrates generally our preferred embodiment of the present invention as a four-input (4×4) crossbar switching apparatus, which has control lines for handling the dual priority selection within the switch.

The "Broadcast/Switching Apparatus For Executing Broadcast/Multi-Cast" Transfers over Unbuffered Asyncgronous Switching Networks by H. T. Olnowich et al U.S. Ser. No. 07/748,316, filed Aug. 21, 1991 now U.S. Pat. No. 5,409,461 and "Multi-Sender/Switching Apparatus For Status Reporting Over Unbuffered Asynchronous Multi-Stage Networks" by H. W. Olnowich et al U.S. Ser. No. 07/748, 302, filed Aug. 21, 1991 (IBM Docket EN991030B) meet a need for improved switching network approaches using parallel connect crossbar switches (a non-loop or transmission line approach) for circuit switching networks for asynchronous, dedicated path (not time slotted), byte wide parallel direct connect switching, which is applicable to multi-stage networks. The way for executing broadcast/ multi-cast transfers over unbuffered, asynchronous, switching networks solved the broadcast problem for simple low priority broadcast in an unbuffered multi-stage network capable of supporting only one broadcast at a time in the network and consuming all of the network facilities. This concept meets the needs of many low end systems and provides an inexpensive and easy solution that doesn't required any clock signals whatever to execute.

The present invention expands on the simple asynchronous broadcast disclosed in an earlier device and provides a more complex, yet faster and higher powered broadcast and multi-cast function that works synchronously and requires a clocking control signal to execute. The disclosed invention permits multiple broadcasts to be queued at the switching apparatus and resolves the broadcast contention on a synchronous priority driven basis that permits one broadcast to follow the other at the earliest possible moment and the quickest possible speed. In addition, the present invention permits multiple multi-cast operations to occur simultaneously within in the network. This is becoming an increasingly important function for future massively parallel processors consisting of many nodes that can be subdivided into many tasks. With this type of environment it is recognized that multi-cast becomes a very important function, more so than broadcast, because not all processors need to communicate through broadcast. Rather the needs lies in having the subsets of nodes assigned to the same tasks communicate to only the other nodes in its own subset. For this type of communication, multi-cast provides the solution. The present invention provides a network capable of sustaining many multi-casts simultaneously, thus, providing a very powerful tool for future parallel applications. The broadcast method described in the invention is understood to be related to the contemporaneously filed U.S. Ser. No. 07/800,652, filed Nov. 27, 1994 now U.S. Pat. No. 5,444,705 entitled "DUAL PRIORITY SWITCHING APPARATUS FOR SIMPLEX NETWORKS" which discloses a way for giving certain network operations a higher priority than others, which is incorporated by reference which in turn is predicated on U.S. Ser. No. 07/677,543, filed Mar. 29, 1991 now abandoned entitled "ALL-NODE Switch - an unclocked, unbuffered, asynchronous, switching apparatus", which performs the basic point-to-point transfers over the said network. The present invention uses the high priority mode of transfer to implement a better performing and more capable mode of broadcast and multi-cast functions.

According to the objects of this invention, functions, interface lines, and hardware are added to the said ALL-NODE Switch to enhance it to additionally perform the priority broadcast and multi-cast functions from any element connected to the said network.

In accordance with the preferred embodiment the dual priority switching apparatus described in U.S. Ser. No. 07/800,652, Filed Nov. 27, 1991 now U.S. Pat. No. 5,444,705 entitled "DUAL PRIORITY SWITCHING APPARATUS FOR SIMPLEX, provides an unbuffered multi-stage network for interconnecting several or many system elements. The invention apparatus as modified with additional hardware provides a means for providing the priority broadcasting or multi-casting functions amongst these elements in accordance with this preferred embodiment It is a feature of this embodiment that a unique interface line to and from each element is provided to define the activation of priority broadcast or multi-cast mode. The System has the ability to process one broadcast or multiple multi-cast operations at a time. In addition, it will not normally reject other subsequent attempts to broadcast or multi-cast when contention or blockage exists, but will hold them pending to be executed in priority order at the earliest moment after the contention subsides.

In accordance with our inventions, we provide a hardware circuit for a common priority broadcast/multi-cast design function which works equally well at any stage whatsoever of the network.

In accordance with our inventions, we provide hardware circuitry for the detection and correction of deadlock conditions in the multi-stage network. Deadlock conditions are not expected to be usual conditions in the network, but there is a possibility of their occurrence resulting from multiple simultaneous broadcasts or multi-casts colliding within the network in a manner which is not resolvable. The hardware circuitry detects all the different types of deadlock conditions automatically and issues reject or retry indications to the network paths involved. The network deadlock is thereby eliminated, and the two broadcasts or multi-casts involved continue their operation in a rearranged sequence that will not cause deadlock.

In addition, the invention apparatus has the capability of providing a positive feedback acknowledgment that it has made connections to all the commanded paths. This is provided uniquely for each stage of the network. Turning now to the drawings in greater detail, as illustrated by FIG. 1, showing the preferred switch, the preferred switch shall be a 4×4 crossbar which operates asynchronously to transmit 4 bits of data in parallel FROM any of 4 input ports TO any of 4 output ports. Such a switch as shown in FIG. 1 is capable of supporting up to 4 simultaneous connections at any instant of time. The assumed switch shall be capable of operating in either of 2 modes—a low-priority mode or a high-priority mode. The description of the individual modes are given below.

It is here understood that the FIG. 1, FIG. 2, FIG. 3, and FIG. 4 are illustrations which are common to U.S. Pat. No. 07/677,543, now abandoned the parent application which is incorporated herein by reference as to all of its contents. The disclosure made therein has been modified by the logic and timing of control signals which are illustrated by FIGS. 5 to 14.

As illustrated by FIG. 1 the preferred switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

However, by the modifications made and illustrated herein, a dual priority switch will be provided for consistent operation in a multi-stage network. The switch would allow for two priorities, and assign a different priority level to each function, and allow each function to be transmitted over the same physical single network path.

The preferred embodiment is a 4×4 crossbar switching apparatus, where the function of the present invention is to provide a means of connecting any of four input pods on a mutually exclusive basis to any one of the unused four output pods on a priority basis.

Referring to FIG. 1, the 4×4 crossbar switching apparatus can support up to four simultaneous connections at any given time. For instance, Input 1 could be connected to Output 3, Input 2 to Output 4, Input 3 to Output 2, and Input 4 to Output 1.

Figure 2:
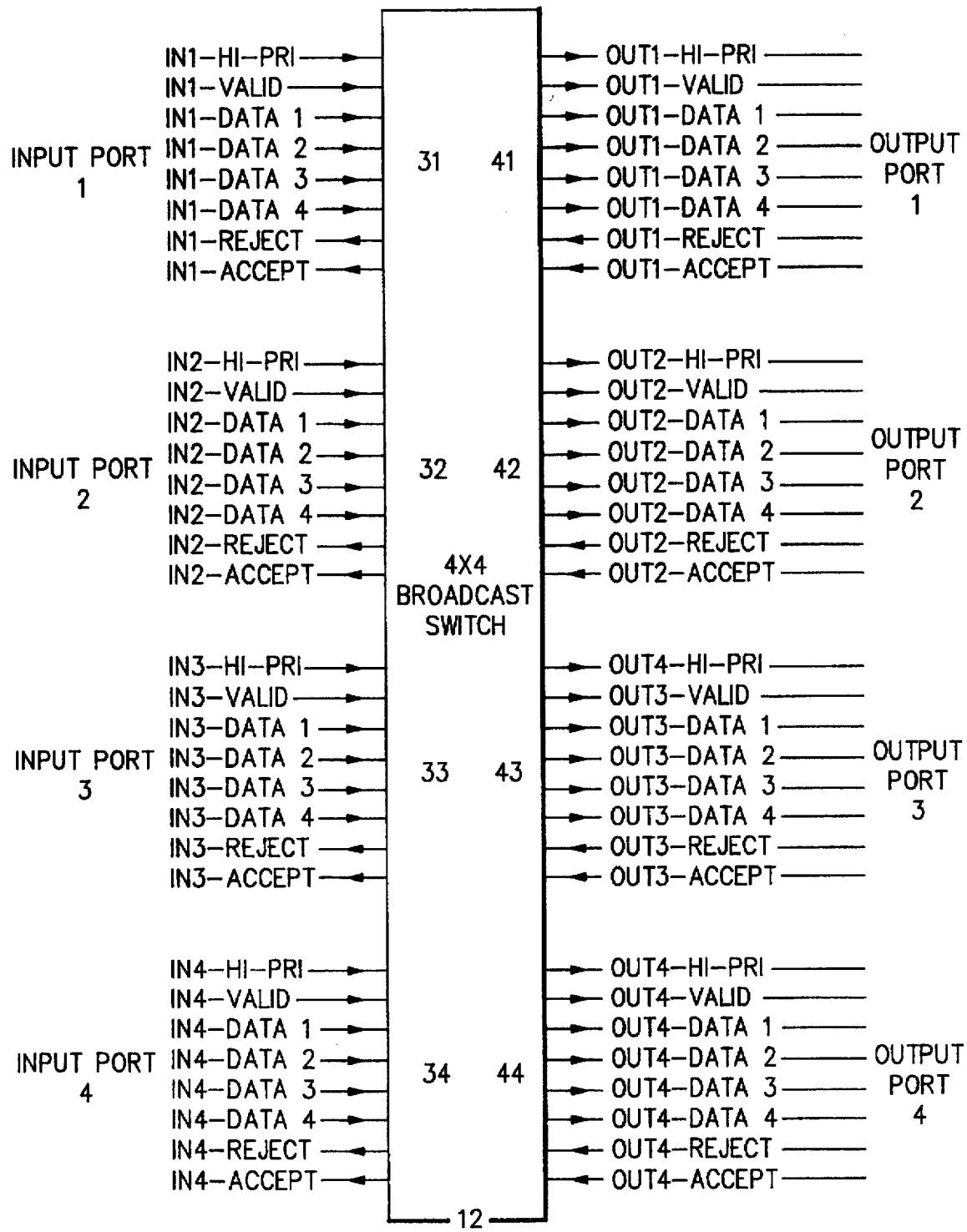
FIG. 2 shows in more detail, as illustrated also in the prior parent application U.S. Ser. No. 07/677,543, the detailed schematic of the 4×4 crossbar switching apparatus and its interface connections including a new HI-PRI interface line at every input and output pod to control the dual priority mode of the switch.

The invention switching apparatus 10 is unidirectional, which means that data flows in only one direction across the said switching apparatus 10, that being from input to output. Although the said switch apparatus 10 is unidirectional, it supports bidirectional communication amongst four nodes (20, 22, 24, and 26) by connecting the 4×4 ALL NODE switching apparatus 10 as shown in FIG. 1. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output pods. The switching apparatus 10 provides exactly the same function for each input port, allowing it to be connected to any unused output port. As illustrated by FIG. 2 the switch 12 has four data bit inputs and four control inputs. A new high priority (HI-PRI) interface control line is added to the basic ALLNODE switch design to implement the new dual priority function. In addition, the VALID and REJECT control signals remain, as well as the ACCEPT line which becomes mandatory line.

Referring thus to FIG. 2, block 12 shows an expanded drawing of switching apparatus 10 and defines in detail the interface lines connecting to switching apparatus 10. The set of lines 31, 32, 33, and 34 at each in-port to the switching apparatus 12 are identical in number and function to the set of lines 41, 42, 43, and 44 at each out-port. The sets of interface lines to each input and output port contain eight unique signals: four data lines and four control lines (VALID, REJECT, ACCEPT, and HI-PRI (High Priority) which are differentiated by a prefix of INX- or OUTX- indicating the direction and number of the port (X) that they are associated with. The four data and VALID and HI PRI lines have a signal flow in the direction going from input to output across switching apparatus 12, while the REJECT and ACCEPT control lines have a signal flow in the opposite direction.

The sets of input port interface lines 31, 32, 33, and 34 transfer control information to switching apparatus 12 for the purpose of commanding and establishing input port to output port connections internal to the said switching apparatus. In addition, the said port interface lines also carry data information to be transferred from input port to output port across the switching apparatus 12. The four data interface lines contained in interfaces 31, 32, 33, and 34 do not restrict the transfer of data across switching apparatus 12 to only four bits of information, but rather the said four data lines can each contain a string of serial data making the transmission of any size data possible. For example, the said four data lines could transfer data at a 160 Mbits/sec rate, if all four data lines were transmitting serial data at a 40 MHZ rate.

Figure 3:
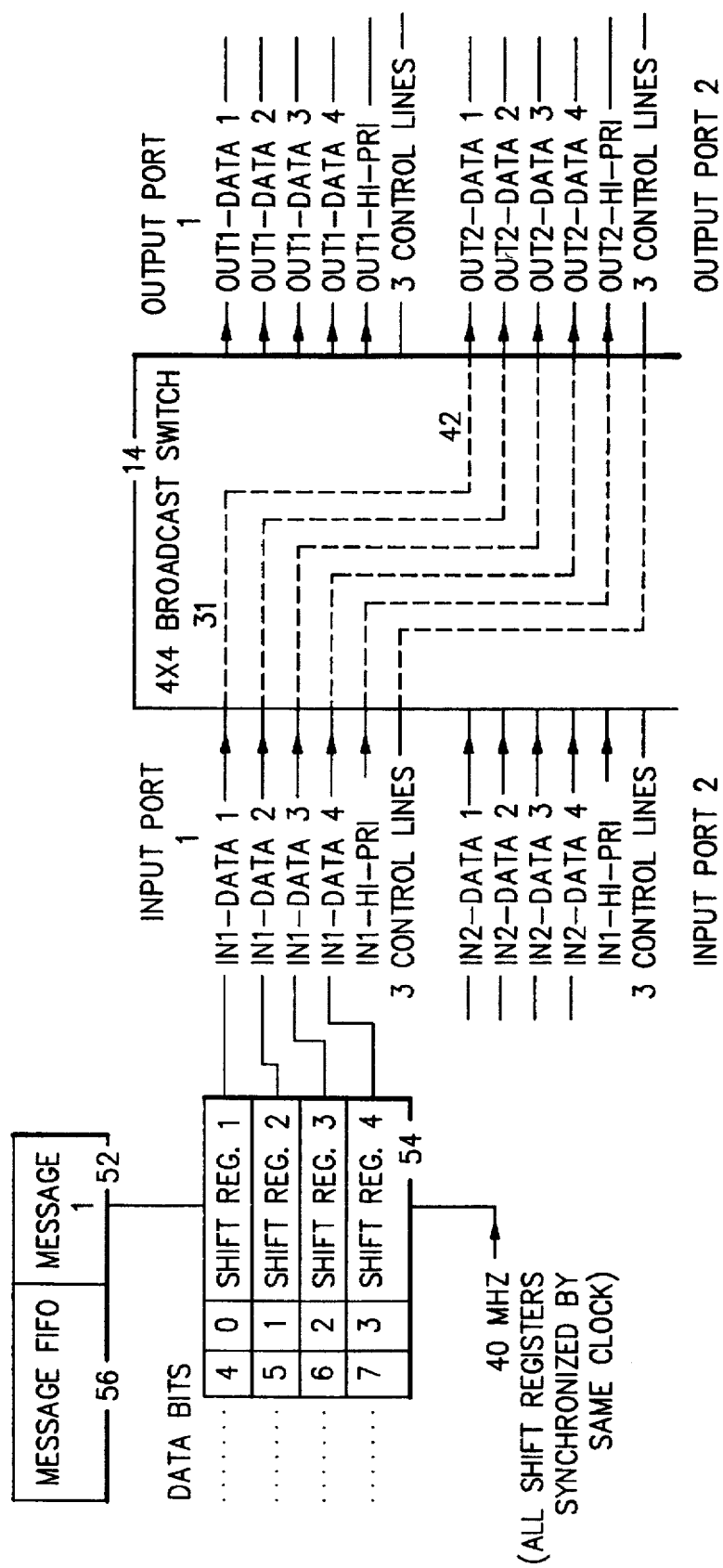
FIG. 3 shows illustrates a typical method for generating serial data information to be sent to the present invention over four data lines.

The Switch Interface requires only 8 signals, as shown in FIG. 3, to transmit and control dual priority data through the network—the data transfer width is ½ byte (4 bits) at a time. The signals required are:

DATA: 4 parallel signals used to command switch connections and transmit data messages.

VALID: When active, indicates that a message is in the process of being transmitted. When inactive, indicates a RESET command and causes all switches to reset to the IDLE state. All switch functions are reset, except the high priority latches.

HI-PRI: When active, indicates the message in process is in high priority mode. When inactive, issues a TERMINATE high priority command and causes all associated high priority latches to reset. This line must be active during the duration of priority broadcast and multi-cast operations.

REJECT: This signal is the only bi-directional interface signal. Signal flow is in the opposite direction from the other 6 signals for low priority transfers. When active for a low priority transfer, it indicates that a REJECT condition has been detected. For a high priority operation when performing either broadcast or multi-cast operations, the signal flow is in the same direction as the data flow across the switch and the signal is used to correct deadlock conditions occurring between different stages in the switching network (deadlock type 2 conditions).

ACCEPT: Signal flow is always opposite to that of the other 6 signals. When in the zero state, it indicates that a WAIT condition has been detected and a high priority connection cannot be made at this time. When in the high state, it indicates that the WAIT condition has ended and the commanded high priority connection has been established.

Referring to FIG. 3, blocks 56, 52, and 54 illustrate a typical method for generating serial data in the form of a message which can be transmitted to and across switching apparatus 14, which is a partial drawing of the switching apparatus 12. Similar serial data generation logic as provided by 56, 52, and 54 can be used at each of the other input ports to switching apparatus 12. Each set of input data lines provides serial data to a given input port which is synchronized to the same clock by the four shift registers 54 which create serial data by shifting four synchronized lines of data 31 as controlled by the same identical clocking signal (40 MHZ in FIG.3). However, the four different input port sources (31, 32, 33, and 34) to switching apparatus 14 can be asynchronous to each other, being based on different, non-synchronized, 40 MHZ clocking signals.

The process for sending serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 3 illustrates via dashed lines, the switching apparatus establishing a temporary connection between input port 1 (31) and output port 2 (42), such that each of the seven individual lines in interface 31 are uniquely and directly connected to each of the corresponding lines in interface 42.

Figure 4:
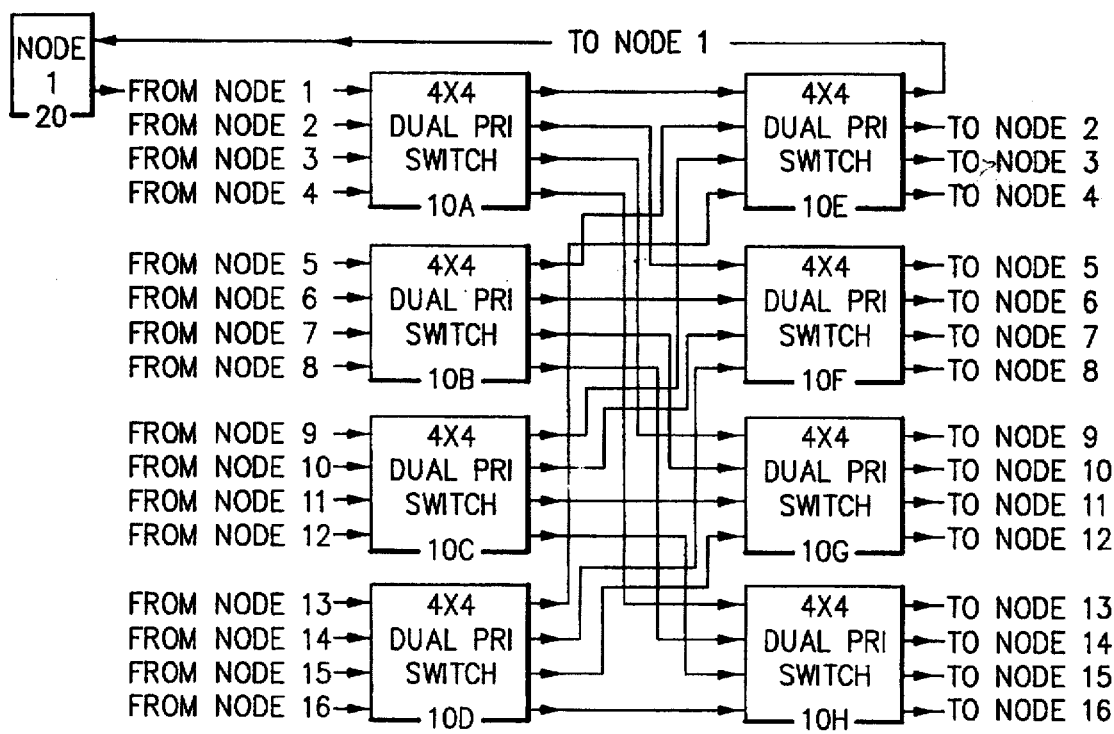
FIG. 4 shows a typical method for cascading the preferred 4×4 switching apparatus into multi-stage networks to accommodate systems having more than four nodes.

Referring to FIG. 4, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner. The number of nodes possible to interconnect with this type of network can become very large; however, for simplicity the network in FIG. 4 will be assumed throughout this disclosure, since it typifies the characteristics of larger networks.

In the low-priority mode the switch will be capable of receiving commands from each input port, commands that can arrive asynchronously and request connection to a specific output port. If the requested output port is available (NOT BUSY; i.e., not being used to support a previously commanded connection), the command shall be executed and the connection established. If the output port is BUSY, the command shall be rejected and the input port will return to the IDLE state (i.e., ready to accept any subsequent command it receives). This rejected connection in the low priority mode is referred to as a KILL operation because the entire path in the network is broken down or KILLED, if any pad of the complete path cannot be established.

Switches can be cascaded together to form networks larger than the 4×4 interconnection scheme supported by an individual switch. FIG. 4 shows how this is done by connecting an output port from one switch to the input port of a second switch. A possible occurrence in this larger network is that the initial switches establish valid connections and a subsequent switch is BUSY and thus issues a REJECT. The REJECT indication then gets sent in the reverse direction back to the previous switch's output port—which has already established a valid connection. In this case, the switch shall dissolve its valid connection and indicate this action by sending a REJECT signal to the input port to which it was previously connected. In turn, the input port will issue a REJECT to its source and then return to the IDLE state. This approach is called KILL, because a REJECT sequence causes all previously established connections to be broken or KILLed and everything in the KILL path to be returned to the idle state. Also, any portion of the message whose transmission has been initiated is completely lost or KILLed and any retransmission of the message must be reinitiated from the very beginning.

If 2 or more of the input ports receive commands simultaneously and contend with each other to establish connection to the same NOT BUSY output port, the lower numbered input port shall win the contention, make the connection desired, and the other contenders shall be rejected and their connections KILLED. Accordingly, it will be seen that the low-priority path through the simplex network uses the KILL function. If rejection occurs in any part of the path, the entire path is broken down immediately and the message must be retransmitted from scratch.

Single destination messages, priority broadcasts, and priority multi-casts are all capable of being transmitted over the high priority path through the network. The high priority mode performs differently than the low priority mode in that it sets a special high priority pending latch, which inhibits the issuing of REJECT in response to a blocked connection, but instead holds that connection or connections (broadcasts or multi-casts require more than 1 connection) pending at the switch until the blocked connection or connections becomes available. Then, it immediately makes the pending connection(s) and issues a positive feedback to the requester. The pending connection cannot be lost or lose its priority unless it is terminated by the message source or reprioritized by the deadlock correction function.

Instead of a REJECT response, the high priority mode issues a WAIT response, if a connection cannot be made. The WAIT response consists of driving the ACCEPT signal to zero and holding it at a zero for the duration of the WAIT condition. When the pending connection is made, the ACCEPT signal is driven to a logical 1 as a positive indication that the WAIT state is over. When the node requesting a connection senses a WAIT response, it temporarily pauses its message transmission and continues from where it left off when the WAIT condition subsides. Thus, in the high priority mode, the transmitting node doesn't retransmit a blocked message from the beginning, like it does in the low priority mode, but instead just pauses and continues when ACCEPT rises. The timing is such that the transmitting node receives the ACCEPT indication to continue at the earliest possible moment, thus allowing the high priority message to be transmitted at the earliest possible time. In addition, all stages previous to the blockage (in which connections were previously won) are held for the duration of the WAIT period and never have to be re-established again for the high priority message, broadcast, or multi-cast in progress. Thus, it provides for the guaranteed delivery of a high priority single destination message and for delivery of broadcast and multi-cast messages at the quickest possible time.

If more than one high priority message is waiting for the same output port to become available, the message associated with the lowest numbered input port gets connected first—while the others continue to WAIT in a snapshot register. After all requests waiting in the snapshot register have been serviced, the register is allowed to load again if more high priority requests are pending. The snapshot register gives all requesters an equal chance to make a connection to an output port, before any given requester can be serviced a second time. Thus, it provides a method via the high priority path through a network to prevent any given requestor from being completely blocked from the network and experiencing starvation.

It is possible for larger networks that the initial switches establish valid connections, while a subsequent switch detects a WAIT condition. In this case, the WAIT indication is transmitted in the reverse direction to the previous switch—which doesn't break its connection, but merely propagates the WAIT indication in the reverse direction. This recurs at all previously connected switches until the WAIT gets propagated all the way back to the message source.

It is possible for the source to reset all the high priority path at any time by returning the HI-PRI to the zero state. The source does have the ultimate control over the network.

Figure 5:
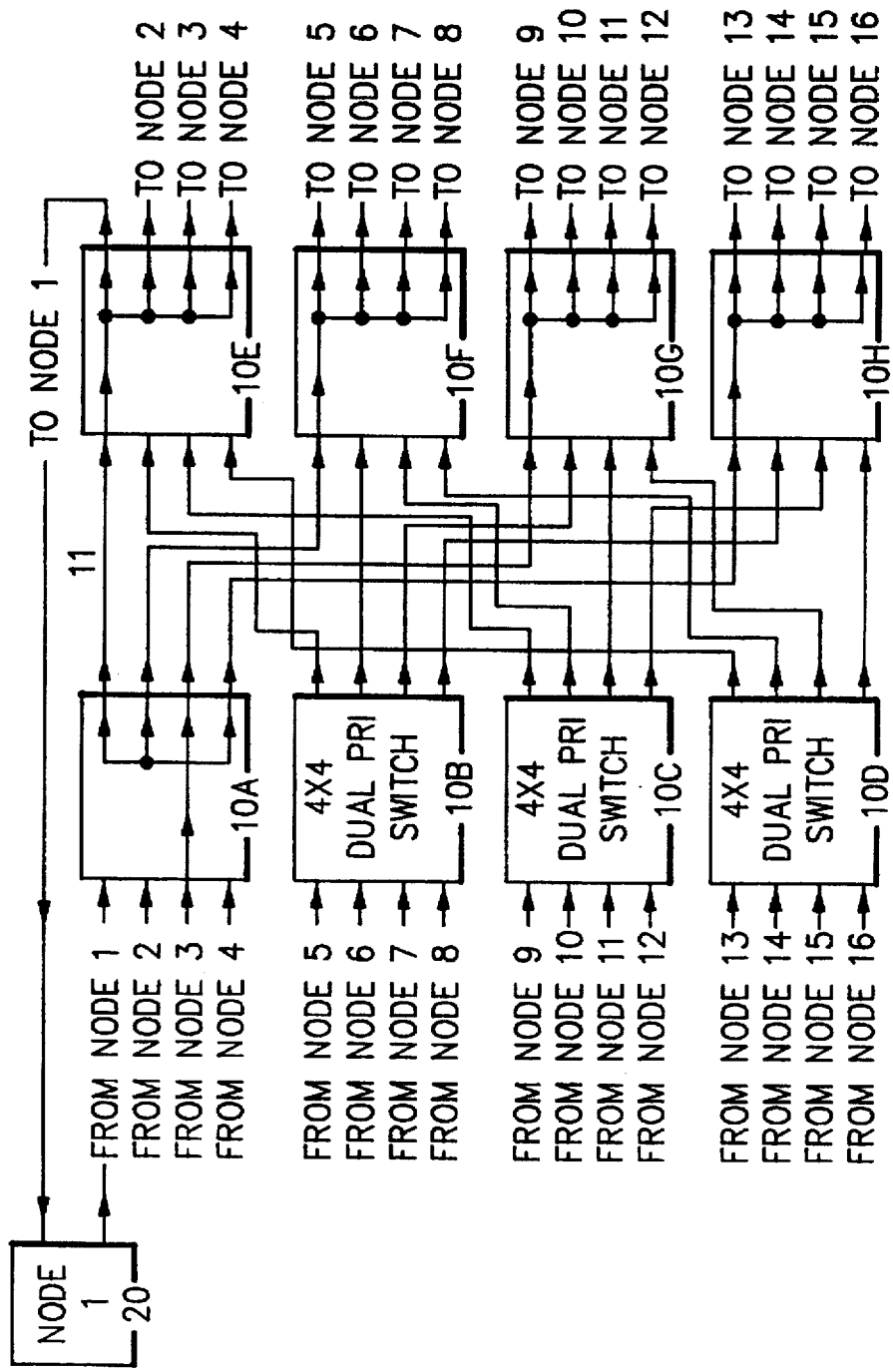
FIG. 5 illustrates a typical priority broadcast example showing how node 3 broadcasts simultaneously to all 16 nodes through two stages of dual priority switches over the high priority path.

Referring to FIG. 5, an example is shown of a two stage network comprised of dual priority switches 10 supporting a broadcast connection from node 3 to all sixteen nodes. Switching apparatus 10A in the first stage of the network forms a connection from its input port attached to node 3 to all four of its output ports. Fixed (non-switchable) wiring provides connection paths between the switching apparatuses 10 of the first and second stages of the network. Switches 10E, 10F, 10G, and 10H in the second stage of the network each connect their input port 1 to all four of their output ports. Thus, the broadcast connection from node 3 to all nodes is achieved. Likewise, any input node to the first stage of the network could be connected to broadcast to all nodes. The switching apparatus 10 services broadcast connections one at a time; although the high priority function does permit other broadcast commands to be sent to the switch. These are held pending at the switch and the subsequent broadcast connections established at the earliest possible time as soon as the previous connections are relinquished.

Figure 6:
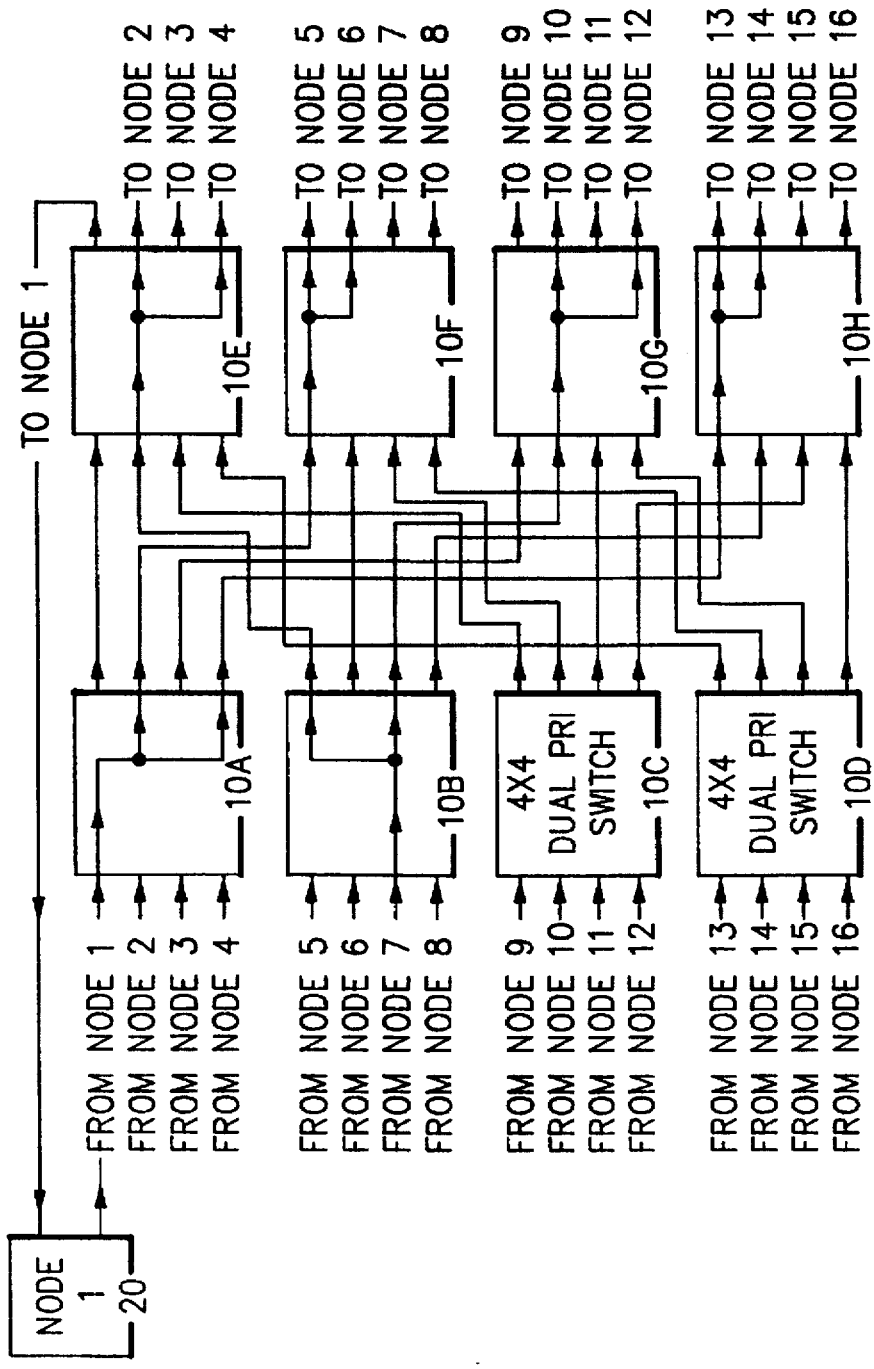
FIG. 6 illustrates a typical priority multi-cast example showing how 2 different multi-casts can exist simultaneously in the same simplex network. A multi-cast from node 7 to nodes 2, 4, 10, and 12 through two stages of dual priority switches is shown simultaneously with a second multi-cast from node 1 to nodes 5, 6, 13, and 14.
Figure 7A:
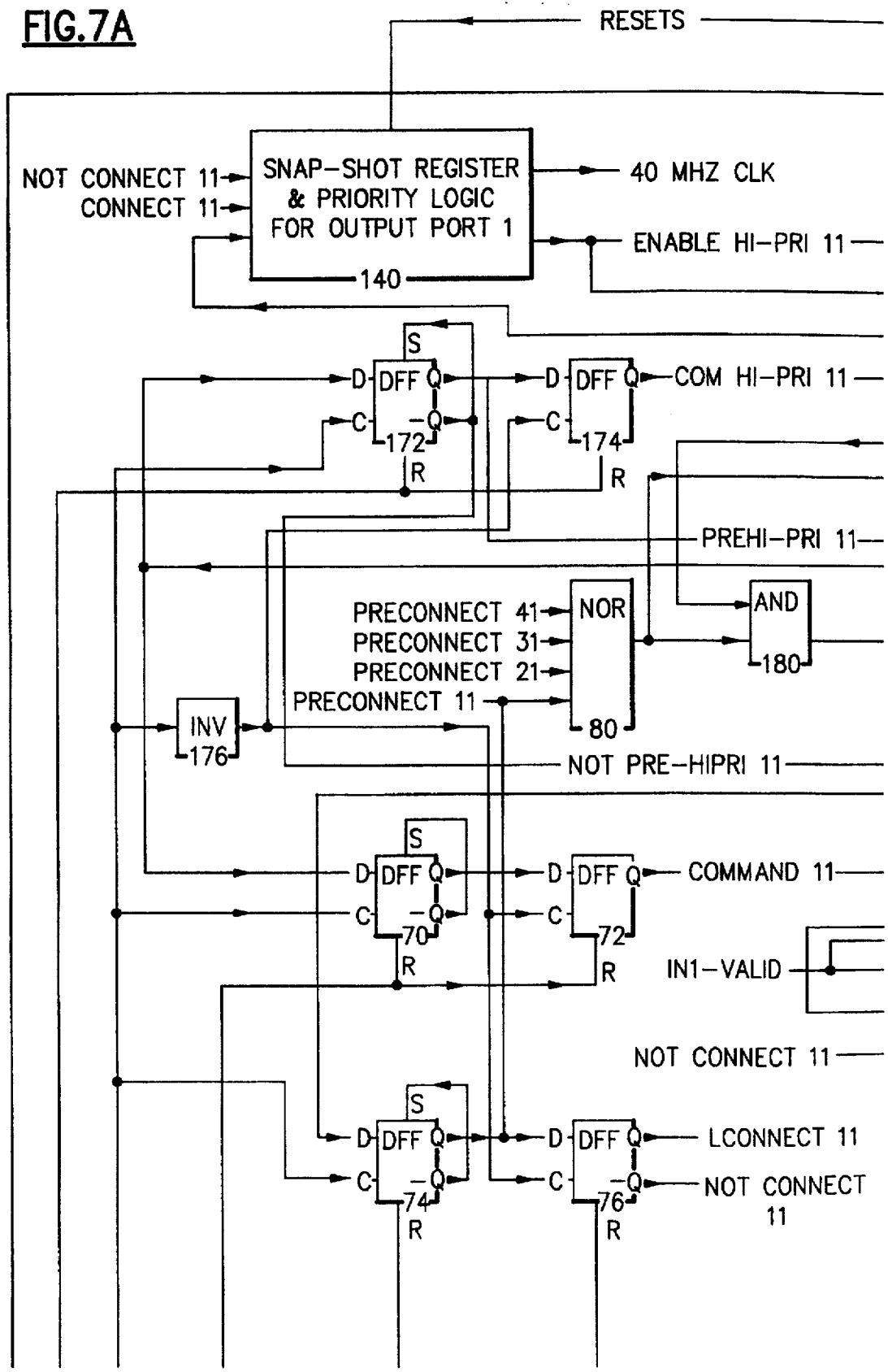
Figure 7B:
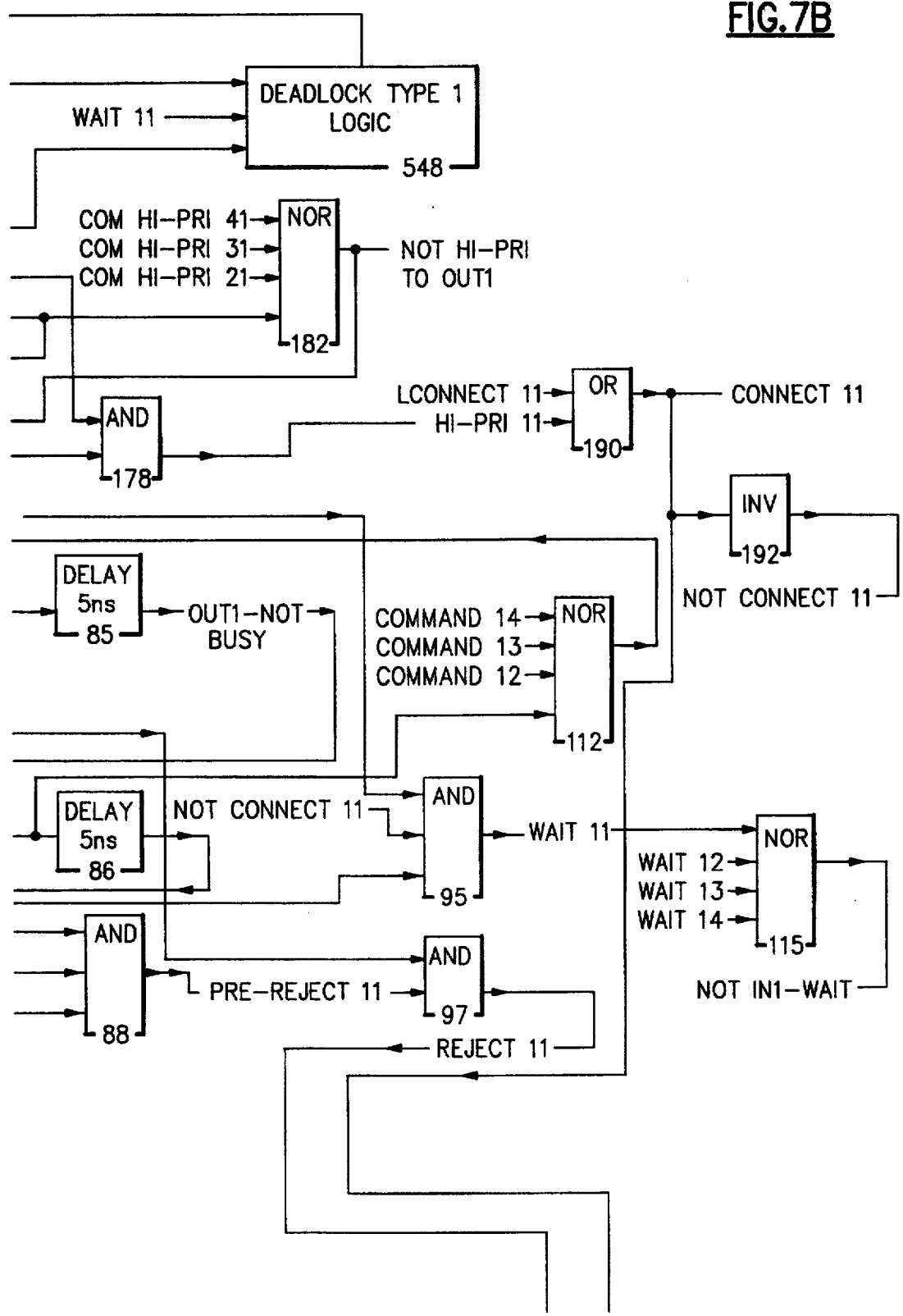
Figure 7C:
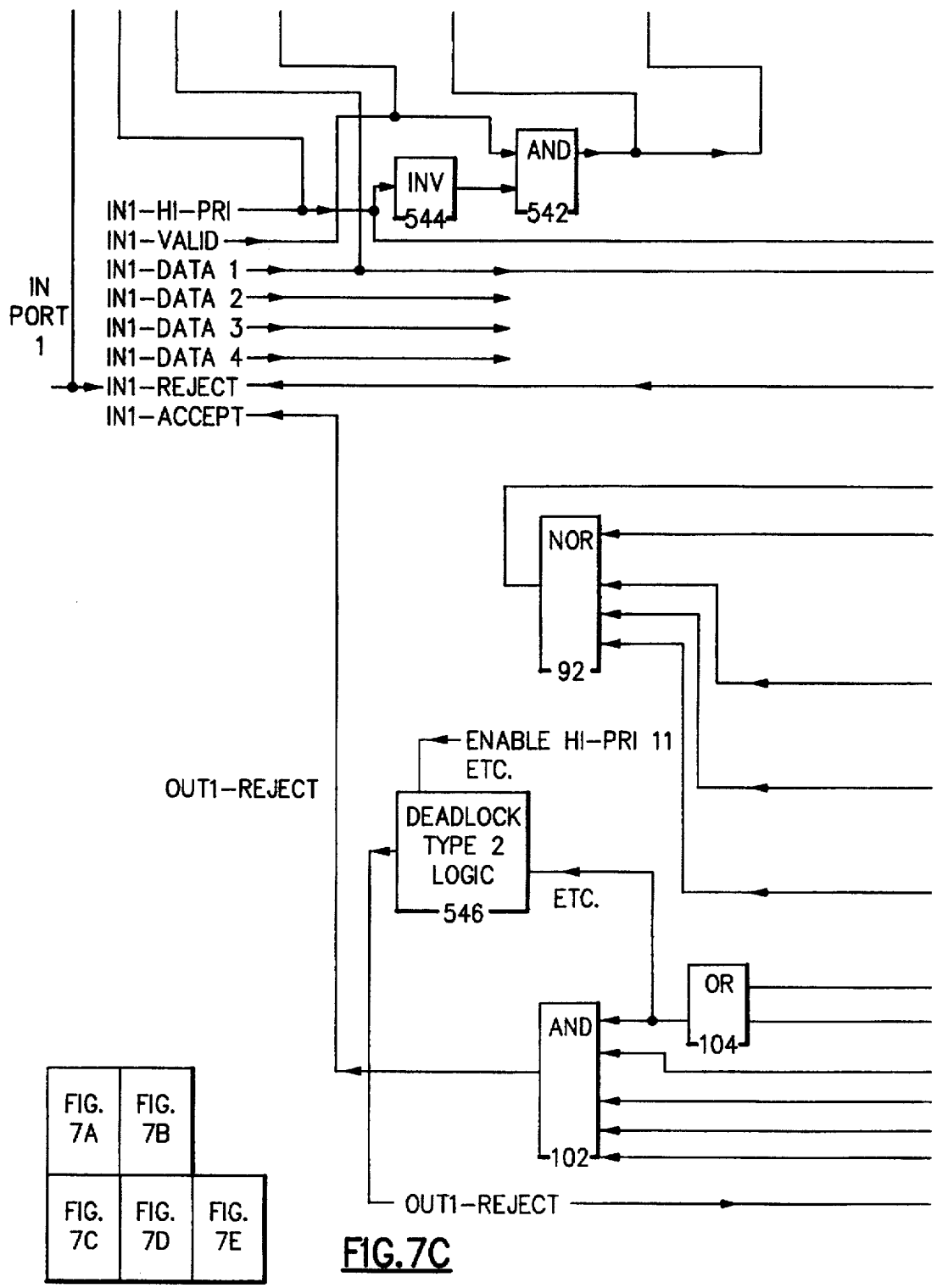
Figure 7D:
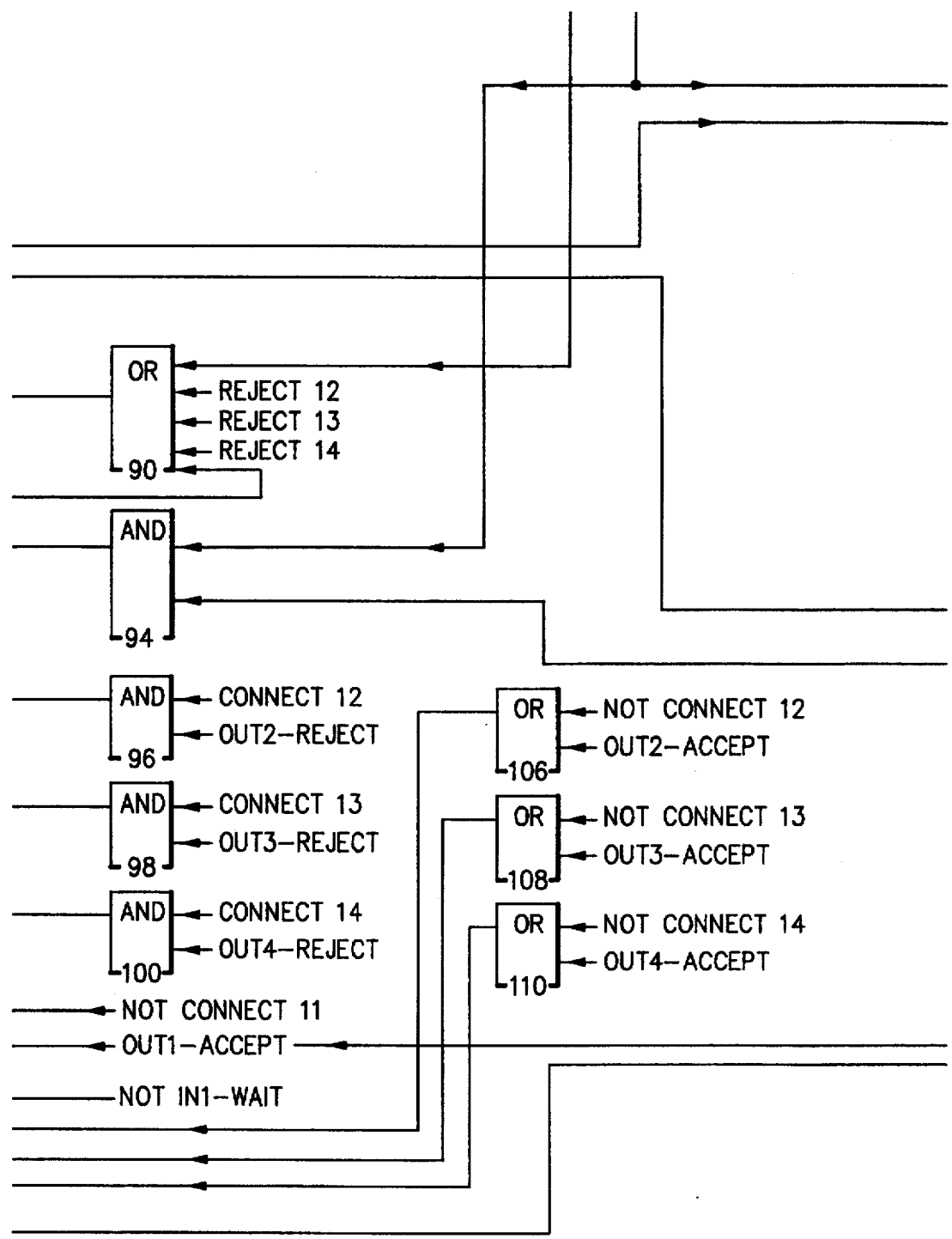

Referring to FIG. 6, a typical priority multi-cast example showing how 2 different multi-casts can exist simultaneously in the same simplex network. A multi-cast from node 7 to nodes 2, 4, 10, and 12 through two stages of dual priority switches is shown simultaneously with a second multi-cast from node 1 to nodes 5, 6, 13, and 14. Switching apparatus 10B in the first stage of the network forms a connection from its input port attached to node 7 to its first and third output ports. Fixed (non-switchable) wiring provides connection paths between the switches 10 of the first and second stages of the network. Switches 10E and 10G in the second stage of the network each connect their input port 2 to their second and fourth output ports. Thus, the desired multi-cast connection is accomplished. Likewise, input node 1 to the first stage of the network makes connections to output ports 2 and 4 and is then connected to nodes 5, 6, 13, and 14 in the second stage to perform a second multi-cast operation simultaneously or overlapped in any manner with the multi-cast shown from node 7. In general, multiple multi-casts can be performed simultaneously, as long as there are no shared connection paths amongst the different multi-cast operations. For instance, node 1 multi-cast could not have existed simultaneously if it wanted to multi-cast to node 5, because node 5 is connected to node 7 multi-cast and could not share its connections simultaneously to two different operations. If a shared path exists, the high priority mode resolves the contention on a priority driven basis and establishes a new connections to the shared path as soon as the path becomes available.

Referring to FIG. 7, the detailed logic implementation is shown for a portion of the dual priority switch 10, the said portion being the typical circuitry required to establish a single low priority or high priority data transfer connection between one input port (such as input port 1) and one output port (such as output port 1) of the preferred 4×4 dual priority switching apparatus 10 embodiment. Latches 70, 72, 74, and 74 control the normal low priority path and their operation is explained in detail as to how they implement the low priority path and how a connection in the switch is broken (KILLED) when a REJECT is encountered as described in, "All-Node Switch-Asynchronous Low Latency Approach to Switching Networks" by H. T. Olnowich, et al; U.S. Ser. No. 07/677,543 07 now abandoned.

The high priority path implementation used for the priority broadcast and multi-cast operations is an addition to the basic ALLNODE Switch logic. The high priority logic is comprised of latches 172, 174, block 140, delay block 84, gates 178, 182, 78, 95, and 115, plus a new interface control signal at every port—such as IN1-HI-PRI at Input Pod 1 and OUT1-HI-PRI at Output Port 1 as shown in FIG. 7. In addition, this disclosure adds some new circuitry specifically required for implementing the priority broadcast and multi-cast operations; these are gates 542, 544, and logic functions 546 and 548. The functional operation of all the high priority logic components, including the priority broadcast and multi-cast operations, will be described in detail in this present disclosure.

Referring to FIG. 8, the timing sequences generated by the node attached to Input Port 1 for the purpose of transmitting a priority broadcast operation are shown. FIG. 8 defines the signal sequences that Input Port 1 uses to command the priority broadcast connection of Input Port 1 to Output Ports 1 to 4 through the dual priority switching apparatus. The operation starts by Input Port 1 activating the IN1-HI-PRI and IN1-VALID interface control lines simultaneously to a logical one. The IN1-HI-PRI signal turns on the high priority logic path in FIG. 7, and its activation to a logical one removes the reset from latches 172 and 174 and enables them. Gates 542 and 544 are used to turn off the low priority path completely during a priority broadcast and multi-cast operation. This occurs when the IN1-HI-PRI interface signal is activated to command the execution of a high priority mode transfer. The IN1 HI-PRI signal is inverted by gate 544 to send a zero to AND gate 542, which in turn sends a reset to latches 74 and 76 since the zero dominates AND gate 542.

The next occurrence, as shown in FIG. 8, is concurrent set of 4 command pulses 81A, 81B, 81C, and 81D are sent to Input port I on IN1-DATA 1, IN1-DATA 2, IN1-DATA 3, and IN1-DATA 4 interface lines, respectively. These 4 pulses command Input Port 1 to make a high priority connections to Output Ports 1 to 4; the command is specified by the IN1-HI-PRI being active to define that it is a high priority connection and by the pulse 81A being on IN1-DATA 1 line which defines that a connection is to be to Output Port 1, by the pulse 81B being on IN1-DATA 2 line which defines that a connection is to be to Output Port 2, by the pulse 81C being on IN1-DATA 3 line which defines that a connection is to be to Output Port 3, and by the pulse 81D being on IN1-DATA 4 line which defines that a connection is to be to Output Port 4. Broadcast is the maximum connection mode as defined by all 4 pulses 81; single destination and multi-cast connections are defined by not transmitting all 4 pulses 81, but eliminating any 1, 2, or 3 of the pulses 81 as a means a defining a subset of the maximum broadcast connection configuration.

A typical example of the logic interpretation of pulses 81 by the switch is shown in FIG. 7 in regards to Pulse 81A on IN1-DATA 1 in causing latch 172 to set on the rise of pulse 81A and latch 174 to set on the fall of pulse 81A. Latch 174 being set causes the dual priority switch to latch the fact that is has received a COMmand to make a HI-PRIority connection from Input Port 1 to Output Port 1 as defined by the COM HI-PRI 11 signal from latch 174. Latch 172 being set causes the PREHI-PRI 11 signal to activate, which in turn causes AND gate 95 to go active creating the WAIT 11 signal. Similar logic to that shown in FIG. 7 for Output Port 1, is used to generate similar functions and signals in relation to each of the other 3 Output Ports. The typical timing for the WAIT signals from each of these other 3 (not shown) sets of logic are shown in FIG. 8. The 4 WAIT signals generate pulses 401 to 404, respectively, based on the occurrence of pulses 81A to 81D, respectively. The four WAIT signals are sent through NOR gate 115 where they are OR'ed and the result is inverted). The function of gate 115 is to cause the priority broadcast to remain in the WAIT State if anyone of the four individual WAIT signals is a logical one to gate 115. The composite WAIT signal (NOT IN1-WAIT from gate 115 goes to AND gate 182, where it is driven back to node 1 over the IN1-ACCEPT line causing pulse 71 as shown in FIG. 8.

Pulse 71 gives a positive acknowledgement to Input Port 1 indicating when the commanded connection has been established. As long as any one of the 4 WAIT signals is active, the dual priority switch is waiting to make the connection: i.e., it has not been successful yet at making the connection to all 4 of the output ports. When the connection is made successfully to all 4 ports, the 4 WAIT signals go inactive, causing gate 115 to go active, and causes a logical one to be passed through gate 182 to cause the IN1-ACCEPT signal to rise, thus completing pulse 71 and giving a positive feedback to Input Port 1 that the connection has been made. Pulse 71 shows the fastest possible connection time where the connection is made quickly (within the duration of the pulses 81) such that pulses 81 and 71 are of the same duration with pulse 71 being delayed by the path it takes through the logic shown in FIG. 7. In order to get this quickest response, all 4 output ports have to be available and accept the newly commanded broadcast connections immediately with only a very shod WAIT period as shown by pulses 401 to 404 occurring at the same time.

The COM HI-PRI 11 signal also goes to NOR gate 182, where it is NOR'ed with other similar signals from the other input ports, any of which will propagate through gate 180 and delay block 85 to cause Output Port 1 to appear BUSY. Likewise, all the other output ports immediately go busy during a broadcast operation. This will cause all subsequent low priority requests for be rejected for the duration of the broadcast.

The making of high priority connections to Output Port 1 are controlled through logic block 140, which receives commands from latch 174 and similar latches related to the other Input Ports and determines the priority in which these connections are to be established. When it decides that Input 1 is the highest priority requester for Output 1, block 140 will activate the "Enable HI-PRI 11" signal—thus informing the dual priority switch to make the connection at this time. The detailed operation of block 140 is described later in relation to FIGS. 9 and 10. The "Enable HI-PRI 11" signal being activated as shown by 207 goes to AND gate 178 where it will be inhibited from propagating any further if a low priority connection is presently active to Output Port 1 as detectable by a latch like 74 being active through NOR gate 80. However, the normal case is that NOR gate 80 does not block the "Enable HI-PRI 11" signal at gate 178 and allows it to pass through and activate the "HI-PRI 11" signal immediately or as soon as the low priority connection is broken. Note that a high priority operation will not permit any subsequent low priority connections to be made until the high priority operations are all completed. However, the high priority operation will not break any low priority connections previously established, it will merely hold the high priority operation pending until the low priority operation releases the connection. The "HI-PRI 11" signal is OR'ed with the low priority signal (LCONNECT 11) in gate 190 to generate a composite signal CONNECT 11 defining to the dual priority switch to make the high priority connection of Input Port 1 to Output Port 1. The Connect 11 signal is inverted in gate 192 and goes to gate 95 where it causes the WAIT 11 signal to go inactive once the connection is made.

The CONNECT 11 signal is also used to establish the direct connection of six interface lines between input port 1 and output port 1. The four data lines of input port 1 become connected to the four data lines of output port 1. The details of a typical connection are shown by AND gate 122 and OR gate 130. CONNECT 11 going active to AND gate 122 causes the output of AND gate 122 to follow directly the values on IN1-DATA1, which is gated through OR gate 130 to OUT1-DATA1. The other AND gates 124, 126, and 128 feeding OR gate 130 will all be held to logical 0's and have no effect on gate 130; this is because normally only one CONNECT signal can be active at any given time, thus enabling a single connection to a specified output port. Therefore, if CONNECT 11 is active to gate 122, CONNECT 21, CONNECT 31, and CONNECT 41 to gates 124, 126, and 128, respectively, must all be inactive. In similar fashion the IN1-HI-PRI and IN1-VALID lines are also connected from Input Port 1 to Output Port 1 based on the CONNECT 11 signal. A typical connection is shown for the IN1-HI-PRI line through gates 154 and 162. The result being that all 6 input signals present on Input Port 1 get connected directly to the same signals at Output Port 1, going directly through the dual priority switch through only 2 gates, such as 154 and 162, and without being buffered, such that the pulse forms appearing on Input Port 1 appear instantaneously on Output Port 1 experiencing only a slight delay caused by the 2 logic gates (like 154 and 162) that they pass through. There is one slight exception where the Input PORT 1 waveforms shown in FIG. 8 differ from the output waveforms; that is pulse 81A is stripped from the input waveform and stored in latch 174 and it is not passed to the Output Port 1. There are 2 reasons for this: 1) By the time the CONNECT 11 signal goes active, pulse 81A is gone and cannot be passed to the Output Port 1. 2) Pulse 81A defines the first stage switch connection to be made and has not other meaning, therefore it is not desirable to pass pulse 81A any further into the network.

For the priority broadcast operation, similar CONNECT signals (CONNECT 12, CONNECT 13, and CONNECT 14) are used to simultaneously connect the same input port 1 interlace signals (IN1-VALID, IN1 HI-PRI, IN1 -DATA1 to 4) to output ports 2, 3, and 4 as soon as they become available to affect the broadcast connection of input port 1 to all 4 output ports through the dual priority switch.

Two feedback signals from the 4 Output Ports to Input Port 1 also have connections established at the time the CONNECT 11 signal becomes active. AND gate 94 shows CONNECT 11 selecting OUT1-REJECT as the source of the IN1-REJECT signal through NOR gate 92 and OR gate 90. The ACCEPT signals from all four output ports come into gates 104, 106, 108, and 110, respectively, and are ANDed together by gate 102. The individual monitoring of the four OUTx-ACCEPT signals is enabled by the inverse of their corresponding CONNECT signals, shown typically by gate 192 generating NOT CONNECT 11 going to gate 104. Likewise, the REJECT signals from each output port are combined in gate 90 to provide a single composite IN1-REJECT signal to input port 1.

In a multi-stage network, pulse 71 going away indicates that the first stage switch in the network has made its broadcast connections. The next step is to command the second stage network switch to make its broadcast connections by issuing pulses 73A to D on IN1-DATA 1 as shown in FIG. 7. The example assumes a two stage network shown in FIG. 4 and that the second stage switch logic, like the first, is identical to the logic shown in FIG. 7. The second stage is commanded to make the exact same high priority connection as the first stage of Input Port I to all 4 output ports by the presence of pulses 73 on all 4 of the IN1-DATA lines. Note that switch stage two does not see pulses 81 that have been stripped of by stage 1 switch.

The events which take place at the stage 2 switch are similar the events which previously took place at the stage 1 switch. The operation starts at stage 2 by Input Port 1 activating the IN1-HI-PRI and IN1-VALID interface control lines simultaneously to logical ones as they get connected through from stage 1. The IN1-HI-PRI signal controls the high priority logic path and disables further use of the low priority path as it did in stage 1. Likewise, the activation of IN1-HI-PRI at the second stage to a logical one removes the reset from latches 172 and 174 and enables them.

The next occurrence, as shown in FIG. 8, is command pulse 73A on IN1-DATA 1 interface line that commands Input Port 1 to make a high priority connection to Output Port 1. Pulse 73A being on IN1-DATA 1 causes latch 172 at the second stage switch to set on the rise of pulse 73A and latch 174 to set on the fall of pulse 73A. Latch 174 being set causes the dual priority switch to latch the fact that is has received a COMmand to make a HI-PRIority connection from Input Port I to Output Port 1 as defined by the COM HI-PRI 11 signal from latch 174. Latch 172 being set causes the PREHI-PRI 11 signal to activate, which in turn causes AND gate 95 to go active creating the WAIT 11 signal. Similar logic to that shown in FIG. 7 for Output Port 1, is used to generate similar functions and signals in relation to each of the other 3 Output Ports. The typical timing for the WAIT signals from each of these other 3 (not shown) sets of logic are shown in FIG. 8. The 4 WAIT signals generate pulses 405 to 408, respectively, based on the occurrence of pulses 73A to 73D, respectively. Pulses 405 to 408 being of different pulse sizes show an example of the WAIT period being of different durations for establishing a connection to each of the 4 output ports; i.e., some of the output ports are assumed to have previous connections so that they cannot respond at the quickest possible instant as shown in stage 1 by pulses 401 to 404, but instead they have to wait until the connection becomes available. The four WAIT signals are sent through NOR gate 115 where they are OR'ed and the result is inverted). The function of gate 115 is to cause the priority broadcast to remain in the WAIT state if any one of the four individual WAIT signals is a logical one to gate 115. The composite WAIT signal (NOT IN1-WAIT from gate 115 goes to AND gate 182, where it is driven back to node 1 over the IN1-ACCEPT line causing pulse 75 as shown in FIG. 8. In the stage two case, the WAIT 11 signal (pulse 405) is the last WAIT signal to go away and causes the composite IN1-ACCEPT signal pulse 75 to be elongated until the WAIT 11 goes to a 0, even though the other 3 connections were established sooner.

At pulse 209 time the "Enable Hi-PRI 11" signal is issued by block 140, which assigns the next connection to be made to Output Port 1 as coming from Input Port 1. The "Enable HI-PRI 11" signal being activated goes to AND gate 178 to be OR'ed with the low priority signal (LCONNECT 11) in gate 190 and generate a composite signal CONNECT 11 defining to the dual priority switch to make the connection of Input Port 1 to Output Port 1. The Connect 11 signal is inverted in gate 192 and goes to gate 95 where it causes the WAIT 11 signal to go inactive (as shown by the termination of pulse 405).

Note from FIG. 5, that to establish a broadcast connection to all 16 nodes that there are 4 stage 2 switches (10E to 10H) that must all establish broadcast connections similar to the stage two switch described above. All 4 stage 2 switches function identically to the typical stage 2 switch described above, and all receive the exact same interface signals as they are fanned out in broadcast mode by the first stage switch. However, each of the 4 second stage switches (10E to 10H) can experience different WAIT times for establishing their broadcast connections. The individual wait times are reported back to the first stage switch over individual ACCEPT lines, one to each output port as shown in FIG. 2 by signals OUT1-ACCEPT, OUT2-ACCEPT, OUT3-ACCEPT, and OUT4-ACCEPT. Each OUTX-ACCEPT from the first stage is connected to a different IN1-ACCEPT signal coming from the second stage switches 10E to 10H. The 4 second stage switches pass the ACCEPT indication back to switch 10A in the first stage, which in turn sends an indication immediately on its IN1-ACCEPT signal to Node 1. Switch 10A logically "ANDs" all the ACCEPT signals it receives from its four output ports as shown by AND gate 102 of FIG. 8 after gating the signals individually in OR gates 104, 106, 108, and 110. Gates 104 to 110 are used in relation to single destination or multi-cast operations to prevent the second stage switches which are not effected by the transfer from having any affect on the composite ACCEPT signal generated by gate 102. However, for the broadcast operation, all the OR gates 104, 106, 108, and 110 are preconditioned so as to pass the four ACCEPT signals directly to gate 102. Thus, gate 102 collects WAIT signals from all 4 second stage switch ANDS them together. Note that the wait period inside of the switch is indicated by the WAIT signal being a logical 1; however, this indication is signalled outside the switch over the interface line INX-ACCEPT being a zero to indicate wait and a one to indicate that all connections have been made. Gate 102 in stage 1 forms a composite ACCEPT signal based on the value of all 4 OUTX-ACCEPT signals it receives (the 4 OUTX-ACCEPT signals are are connected directly to the INX-ACCEPT signal from all 4 second stage switches). The result being that gate 102 will not go active until all 4 second stage switches report that they have successfully made connection to all 4 of their associated output ports. If any one of the four inputs to gate 102 is a zero (indicating wait), the output of gate 102 will be a zero and return a zero to node 1 over the IN1-ACCEPT line from stage 1—keeping pulse 75 in the zero state. However, when all 4 inputs to gate 102 return to the one state, indicating that all 16 broadcast connections have been made, the output of gate 102 goes to a one causing IN1-ACCEPT to go to a one and pulse 75 to terminate. Pulse 75 gives a positive acknowledgement that all 16 of the stage 2 connections have been established. ANDing of the ACCEPT signals requires that an active ACCEPT signal is sent from all receiving nodes attached to the output ports of each broadcast/switch before an ACCEPT signal is forwarded to the previous broadcast/switch stage or to Node 3. When Node 3 sees the ACCEPT signal go active, it gets a positive feedback indication that the transfer completed successfully to all sixteen nodes. Node 3 then resets its IN3-BRDCAST, IN3-VALID, and four IN3-DATA lines to broadcast/switch 10A to zeroes, thus completing the broadcast and returning its interface to the IDLE state. The IN3-BRDCAST and IN3-VALID input lines going to a zero at clock time n+3 causes broadcast/switch 10A input port 3 to break its connection to all four output ports, returning them to the IDLE state. Immediately, broadcast/switches 10E, 10F, 10G, and 10H see their respective IN1-BRDCAST and IN1-VALID input lines go to zero, breaking their connections to all their four output ports and returning them to the IDLE state. Thus, the connections can be broken and the broadcast/switches returned to IDLE in as little as one clock time. If Node 3 has another broadcast or non-broadcast message to transmit, it can load the next message into buffer 52 and shift registers 54 (FIG. 7) and begin transmission as soon as clock time n+4. The only restriction is that the VALID signal generated by Node 3 must return to zero for a minimum of one clock time (time n+3) to signify the end of one transfer before beginning another.

This completes the establishment of the high priority broadcast connections through both stages of a two stage network. The path connections are now established and MESSAGE DATA can be broadcast from node 1 to all 16 nodes simultaneously, as shown in FIG. 8. The result of this implementation is that a high priority path is established at the quickest possible speed because the high priority command is stored at the switch stage involved and made on a priority basis as soon as output ports required become available. In addition, a positive feedback is given to the node establishing the connection immediately upon the making of the connection, so that it may proceed at the earliest possible moment.

After the MESSAGE DATA has been broadcast to all nodes, all the receiving nodes can check the message for accuracy using the selected error detection method (parity, CRC, etc.). If the message has been received correctly, each receiving node responds by activating its ACCEPT signal back to the second stage switches 10E to 10H in the network shown in FIG. 5. The second stage switches pass the ACCEPT indication back to the first stage switch 10A, which in turn returns it immediately to Node 1. Each switch (10A and 10E to 10H) logically "ANDS" all the ACCEPT signals it receives from its four output ports as shown by AND gate 102 of FIG. 7. This ANDing of the ACCEPT signals requires that an active ACCEPT signal is sent from all receiving nodes attached to the output ports of each switch (10E to 10H) before an ACCEPT signal is forwarded to the the first switch stage 10A or to Node 1. In order for the ACCEPT function to operate accurately in multi-cast mode, the switch must cause the ACCEPT interface lines from all output ports NOT involved in the transmission to go to a logical 1, so they will not prevent the propagation of an accurate ACCEPT indication from the nodes that are involved. This is accomplished internally to switch 10 by gates 104, 106, 108, and 110 for output ports 1 to 4, respectively. Thus, the AND gates 102 in each switch 10 (10A and 10E to 10H) are primed to pass accurate ACCEPT feedback indications for any type of command—broadcast, multi-cast, or single destination. When Node 1 sees the ACCEPT signal go active (Pulse 79 terminates), it gets a positive feedback indication that the transfer completed successfully to all selected nodes. Node 1 then resets its IN1 HI-PRI, IN1-VALID, and four IN1-DATA lines to switch 10A to zeroes, thus completing the broadcast and returning its interface to the IDLE state.

Two new functional blocks 546 and 548 have been added to FIG. 7 as part of the present invention to deal specifically with two different types (TYPE 1 and TYPE 2) of deadlock conditions that can occur while attempting to execute 2 or more simultaneous priority broadcast or multi-cast operations in the simplex network. The detail of blocks 546 and 548 are described later in relation to FIGS. 11 to 14.

Figure 9A:
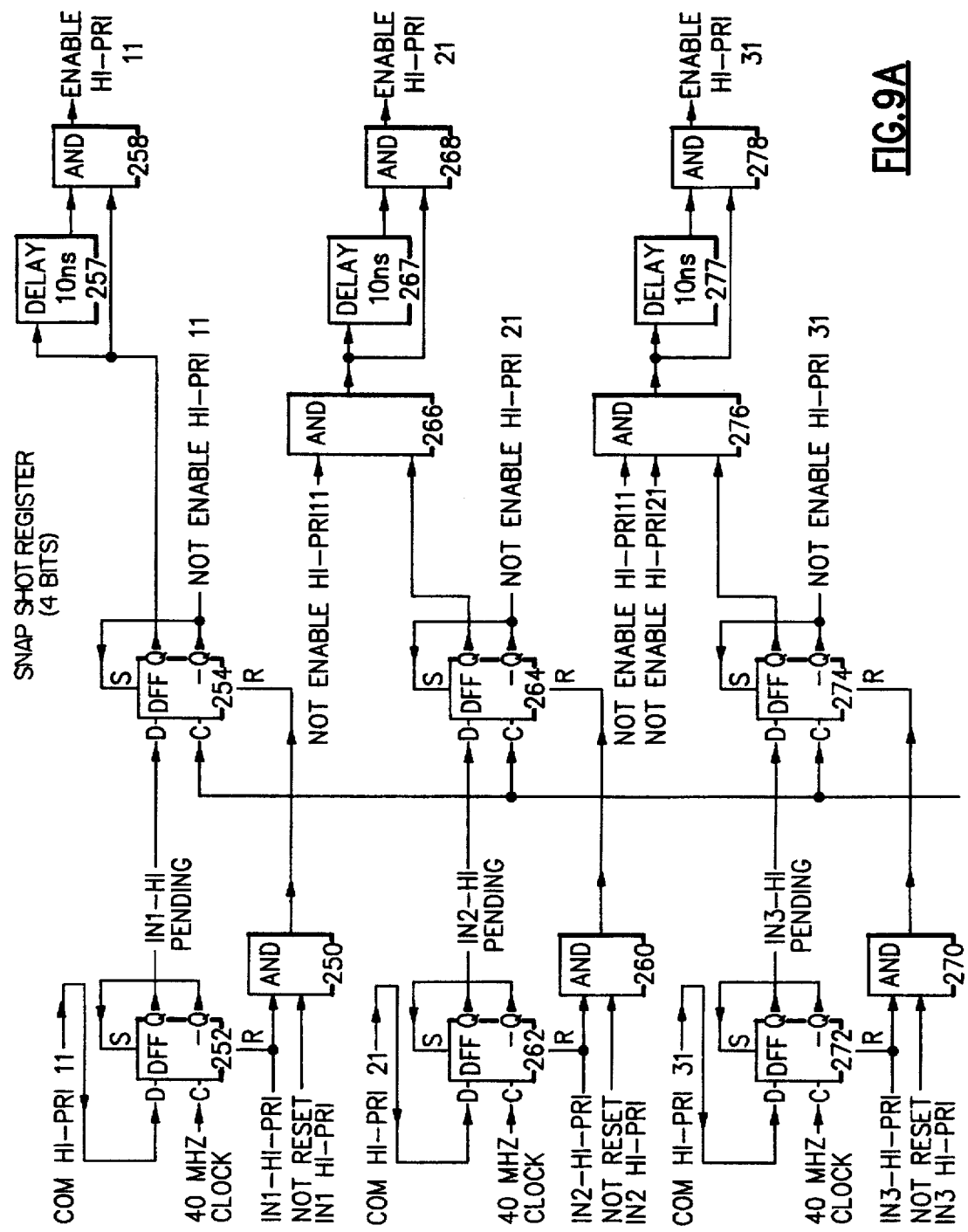

Key to the high priority implementation and the prioritizing of broadcast and multi-cast operations is the function provided by block 140, which is shown in detail in FIG. 9. Typical logic is shown for establishing a high priority connection from Input Port 1 to Output Port I by latches 252 and 254 as they function in relation to gates 250 and 258, and delay block 257. Identical logic is shown for establishing a high priority connection from Input Port 2 to Output Port 1 by latches 262 and 264 as they function in relation to gates 260, 266, and 268, and delay block 267. Identical logic is shown for establishing a high priority connection from Input Port 3 to Output Port 1 by latches 272 and 274 as they function in relation to gates 270, 276, and 278, and delay block 277. Identical logic is shown for establishing a high priority connection from Input Port 4 to Output Port 1 by latches 282 and 284 as they function in relation to gates 280, 286, and 288, and delay block 287.

Block 140 requires sequential logic operations and decisions which require a clock signal to implement. This is the first time that a clock has been necessary to implement any of the ALLNODE Switch concepts. The clock used in FIG. 9 has been selected to be 40 MHZ for the purpose of example, but the clock frequency in general is dependent upon the technology of implementation.

Figure 10:
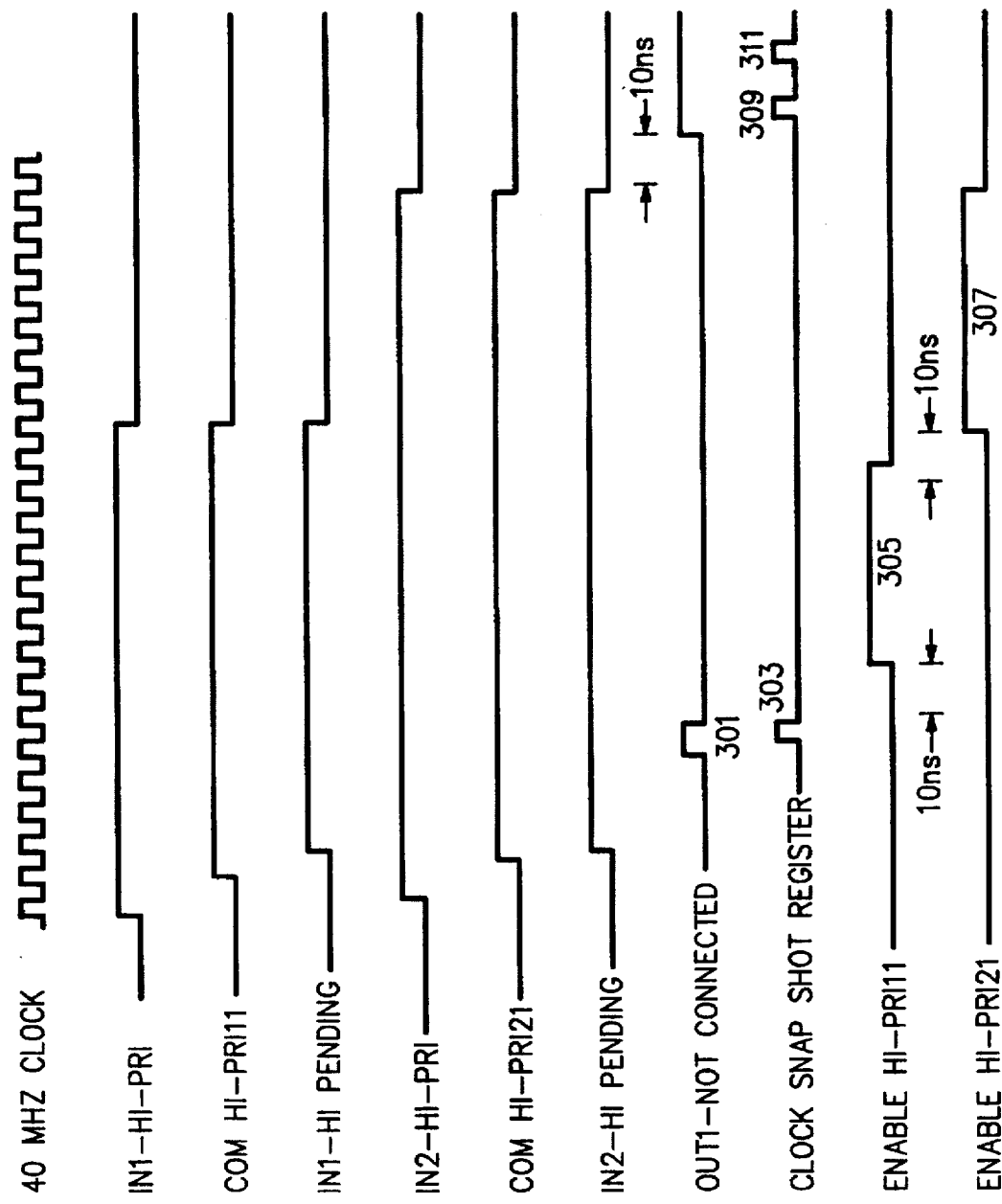
FIG. 10 is a timing diagram, which shows a typical example of the snap-shot register timing and how it services multiple requests sequentially at the earliest possible moment based on a built-in priority scheme.

The functions performed by block 140 and shown in FIG. 9 shall be described here by continuing the previous example of Input Port 1 commanding a high priority connection to Output Port 1, and adding to it a simultaneous request of Input Port 2 commanding a high priority connection to Output Port 1, to demonstrate the priority function. The "COM HI-PRI 11" and "COM HI-PRI 21" signals convey this information to the block 140 by going active to latch 252, where is resynchronized in relation to the 40 MHZ clock. Latch 252 is enabled by the IN1-HI-PRI signal on its reset line to function whenever Input Port 1 is operating in high priority mode. Latch 252 will set and generate the IN1-HI PENDING signal when the "COM HI-PRI 11" signal is active in synchronization with the rise of the 40 MHZ clock signal as shown in the timing of FIG. 10. Latch 252 being set indicates that Input Port 1 has a pending high priority connection that it wishes to make to Output Port 1. The purpose of the block 140 logic is to record this pending command and to make the desired connection on a priority basis at the very earliest moment. The Latch 252 -Q output is fed back into the SET input of the same latch to cause it to remain set after initially being set until the IN1-HI-PRI signal goes inactive on the reset input to the latch and causes it to reset. The latches 254, 264, 274, and 284 comprise the 4-bit SNAP SHOT REGISTER, which allows all pending connections to be made on a rotating priority basis and prevents any individual user from hogging an Output Port connection and causing the starvation of some other user who is unable to make the required connection. The SNAP SHOT REGISTER is allowed to take "snap shots" only at specified intervals for the purpose of determining what connections are pending. The "snap shot" intervals are defined by AND gate 300 which provides the clock signal that causes the SNAP SHOT REGISTER to sample the pending connection requests coming from registers 252, 262, 272, and 282, respectively. The clocking of the SNAP SHOT REGISTER occurs as determined by gate 300 at a 40 MHZ rate when none of the SNAP SHOT REGISTER bits are set and when the Output Port 1 is not busy as determined by the OUT1-NOT CONNECTED signal from gate 320. Basically the SNAP SHOT REGISTER will be clocked at a 40 MHZ rate as long as Output Port 1 has no present connections to it and there are no active bits in the SNAP SHOT REGISTER.

FIG. 10 shows the timing of the SNAP SHOT REGISTER when both Input Ports 1 and 2 issue pending high priority commands to connect to Output Port 1, and Output Port 1 is previously busy with a previous low priority connection as defined by the OUT1-NOT CONNECTED signal 302 being a zero. FIG. 10 shows that in this case, both the IN1-HI PENDING and IN2-HI PENDING latches 254 and 264 get set and both wait for Output Port 1 to become available. At pulse time 301, Output Port 1 terminates its previous connection and becomes available. Assuming that the SNAP SHOT REGISTER has no bits set previously, the CLOCK SNAP SHOT REGISTER signal goes active producing pulse 303 during coincidence with the next 40 MHZ clock signal after pulse 301. Pulse 303 goes to all 4 bits of the SNAP SHOT REGISTER and causes them to set to the state corresponding to the state of latches 252,262, 272, and 282, respectively. In the example, both the SNAP SHOT REGISTER latches 254 and 264 will set at this time. This will cause the "Enable HI-PRI 11" signal to go active after a delay of 10 ns through block 257 and gate 258. This selects Input Port 1 to connect to Output Port 1 next by issuing pulse 305. Note, that even thought latch 264 gets set by pulse 303, "Enable HI-PRI 21 signal doesn't go active at the same time as pulse 305 because it is prevented by gate 266, since the "NOT Enable HI-PRI 11" signal is a zero at this time.

After Input Port 1 sends its message to Output Port 1, it breaks its connection to Output Port 1 by deactivating its IN1-HI-PRI signal as shown in FIG. 10 which in turn resets COM HI-PRI 11, IN1-HI PENDING and ENABLE HI-PRI 11 (a bit in the SNAP SHOT REGISTER). At this time only Latch 264 remains set in the SNAP SHOT REGISTER, gate 266 is enabled to pass the indication to delay block 267 which causes the "ENABLE HI-PRI 21" signal 268 to go active 10 ns later to produce pulse 307 in FIG. 10 and select Input Port 2 to connect to Output Port 1 next. After Input Port 2 sends its message to Output Port 1, it breaks its connection to Output Port 1 by deactivating its IN2-HI-PRI signal as shown in FIG. 10, which in turn resets COM HI-PRI 21, IN2-HI PENDING and ENABLE HI-PRI 21 (based on resetting a bit in the SNAP SHOT REGISTER). Then Output Port 1 has serviced all of its pending connections, the CLOCK SNAP SHOT REGISTER signal 300 begins clocking the SNAP SHOT latches again by issuing pulses like 309 and 311 and which continue until Output Port 1 becomes connected again or until another high priority operation gets latched into the SNAP SHOT REGISTER.

The purpose of delay blocks 257,267,277 and 287 is to prevent one connection from following too closely behind another and causing erroneous operation prior to the time the interface signals settle out.

Figure 11:
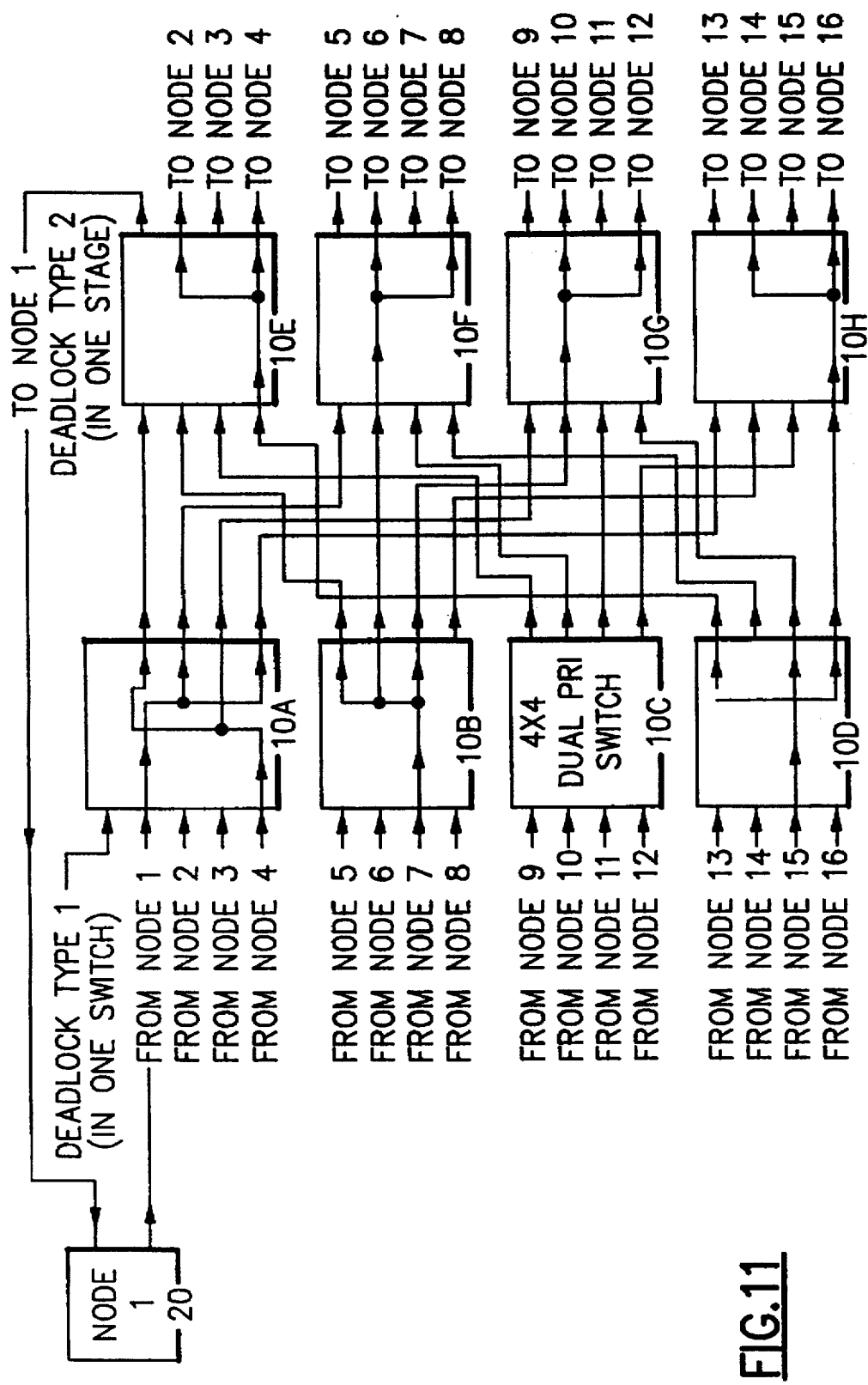
FIG. 11 illustrates the two different types of deadlock conditions (type 1 and type 2) that can occur when executing priority broadcasts or multi-casts over a two stage network comprised of dual priority switches.

Gates 250, 260, 270, and 280 permit latches in the SNAP SHOT REGISTER to be individually reset by the NOT RESET IN1 HI-PRI, NOT RESET IN2 HI-PRI, NOT RESET IN3 HI-PRI, and NOT RESET IN4 HI-PRI signals, respectively. These signals are unique to the broadcast and multi-cast operations and are used to correct deadlock conditions. Deadlock can occur in the network in two different types of circumstances, as shown in FIG. 11. The first deadlock condition, referred to as Type 1, occurs entirely within one switch as illustrated internal to switch 10A in FIG. 11. One example of deadlock type 1 is shown which assumes that node 1 and 4 are trying to multi-cast simultaneously. Node 1 is multi-casting to switch 10A output ports 2, 3, and 4 and is successful in winning output ports 2 and 4 immediately as shown by the connecting lines from input port 1 internal to switch 10A. However, node 1 is unable to successfully complete the multi-cast connection because it can not get a connection to output port 3. Node 4 is multi-casting to switch 10A output ports 1, 2, and 3 and is successful in winning output ports 1 and 3 immediately as shown by the connecting lines from input port 4 internal to switch 10A. However, node 4 is unable to successfully complete the multi-cast connection because it can not get a connection to output port 2. Nodes 1 and 4 have become deadlocked in the example and can never resolve the problem on their own. Node 1 has a connection to output port 2 that it will never release until it gets a connection to output port 3. However, node 4 has a connection to output port 3 that it will never release until it gets a connection to output port 2. The problem is due to a race condition between the two multi-cast operations coming from different nodes at about the same time. This can cause two sets of the SNAP SHOT REGISTERS (FIG. 9), one associated with input port 4 and one with input port 1, to get out of synchronization with each other, such that the priority decision as to which input port gets output ports 2 and 3 are not consistent; i.e., it was decided to give the highest priority for connecting to output port 2 to node 1 and the the highest priority for connecting to output port 3 to node 4. If these decisions were consistent, for instance, if the highest priority for both output ports 2 and 3 were given to node 1 first, there would be no problem because node 1 would go first and then node 4 would go next and deadlock would be avoided. Therefore, the solution is to detect the deadlock condition and cause the SNAP SHOT registers involved to reprioritize to be consistent; then the operations will flow sequentially, rather than causing deadlock. The correction involves removing the inconsistent priorities from the SNAP SHOT REGISTERS and letting the priority be recalculated so that it will be consistent across the various SNAP SHOT REGISTERS. Thus gates 250, 260, 270, and 280 are used in FIG. 9 to reset individual latches 254, 264, 274, 284, respectively, in the SNAP SHOT REGISTER based on individual resets from the deadlock detection and correction logic. The detection is based on a priority decision that is detected to be inconsistent and has caused deadlock. This inconsistent priority decision is reset individually from a latch in the SNAP SHOT register. Note that the reset does not go to latches 252,262, 272, and 282, which do not get reset but continue to hold the connection pending at the switch. Only the priority is changed by resetting a bit in the SNAP SHOT REGISTER, the operation is not lost or affected in any other way. For instance, the highest priority initially in our example for connection to output port 3 is input port 4. When deadlock is detected the latch 284 which gives input port the highest priority is reset. Then priority to output port 3 is recalculated and input port 1 wins the connection to output port 3. This enables input port 1 to successfully establish all of its multi-cast connections and the operation proceeds to completion. After the input port 1 multi-cast is complete, input port 4 wins its required connections and its operation proceeds to completion.

Deadlock type 1 cannot occur for single destination high priority connections; however, it can occur for broadcast or multi-cast operations where an input port must win connections to 2, 3, or 4 output ports within the same switch. For two destination multi-casts, deadlock can only occur if another multi-cast is going to the exact same two output ports, and only then if one multi-cast wins one of the two ports and the other multi-cast wins the other. For simultaneous multi-casts to 3 or 4 output ports within a given switch, the example above in FIG. 11 of switch 10A shows how deadlock can typically occur. For all of the type I cases the deadlock can be detect immediately and corrected immediately without causing any noticeable delay in the transmission.

Figure 12:
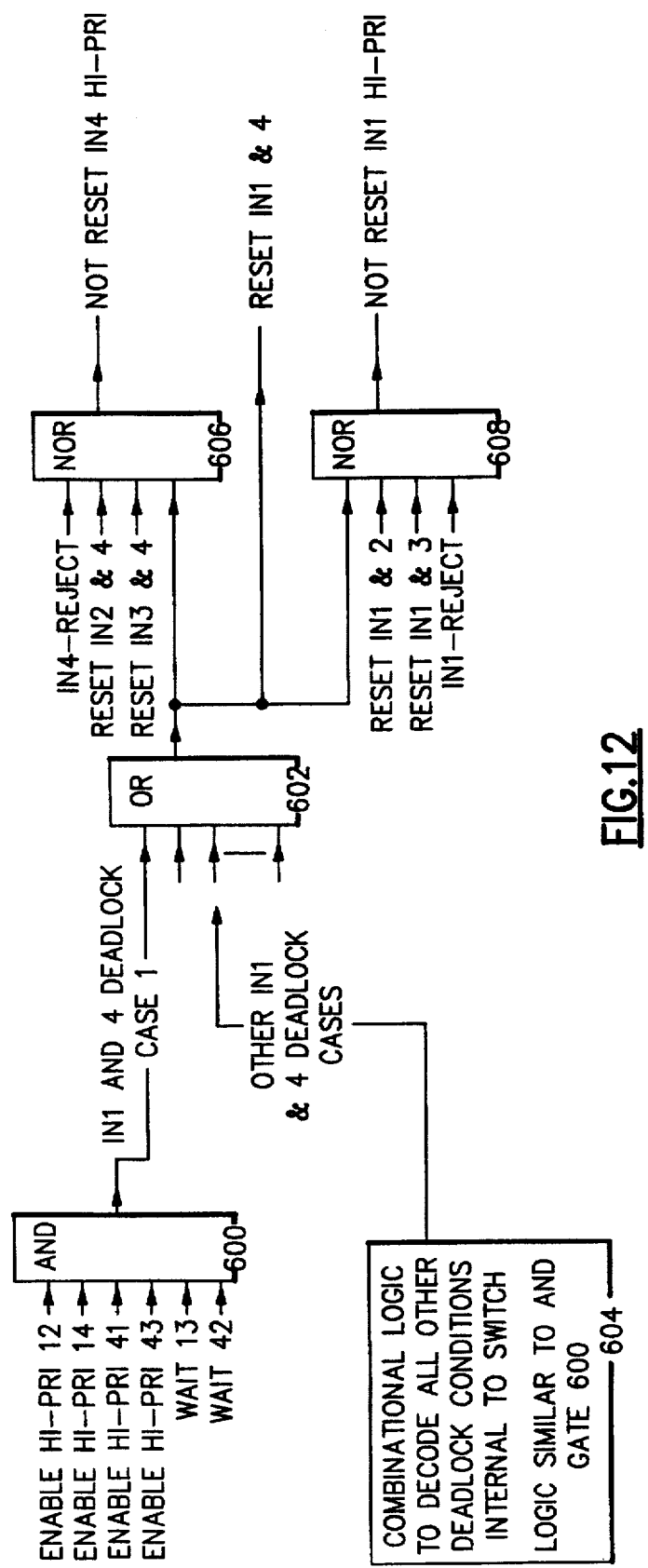
FIG. 12 shows the detailed logic for detecting and correcting deadlock type 1 conditions.
Figure 13A:
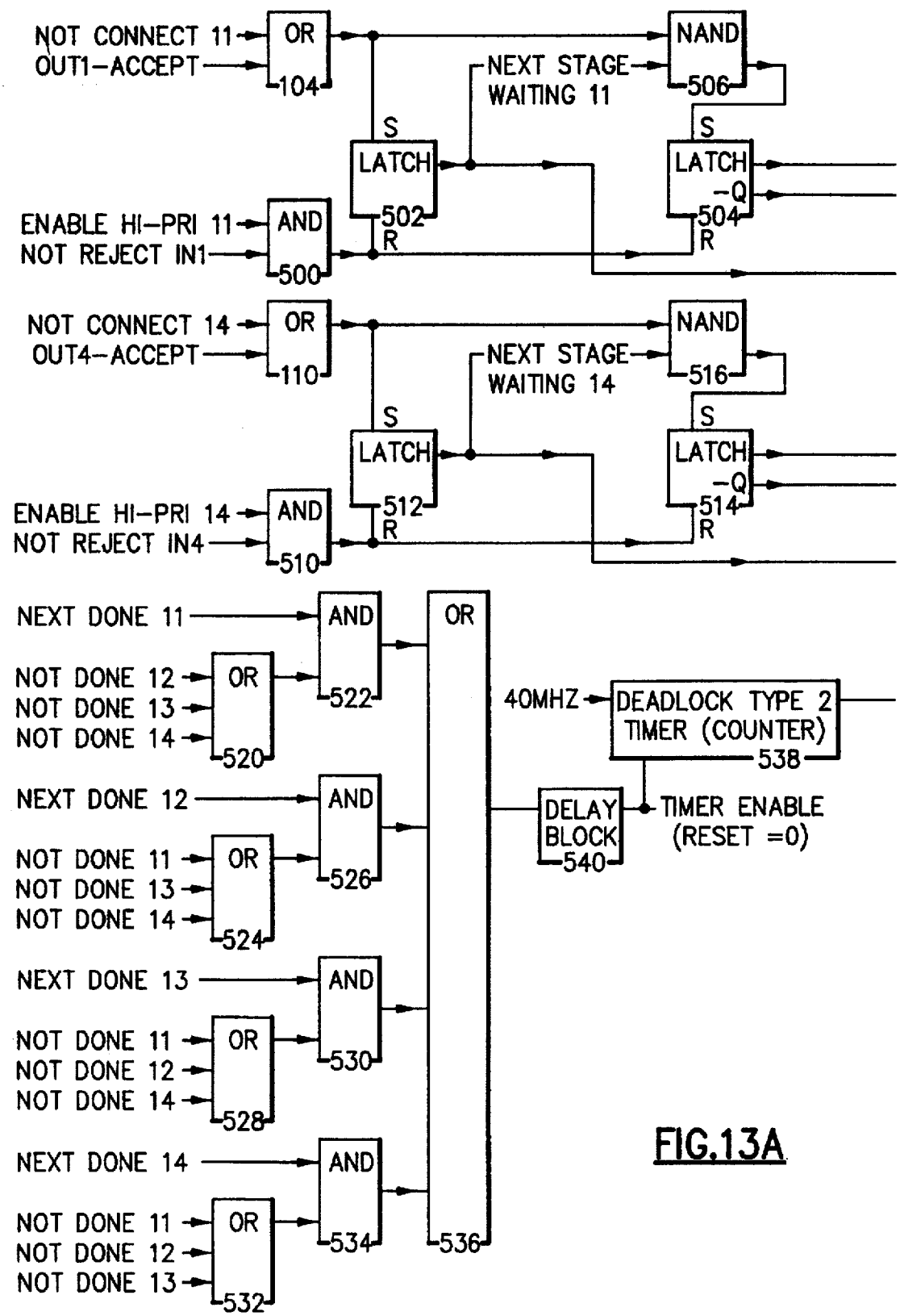

The logic required to detect and correct type 1 deadlock conditions is shown in FIG. 12. AND gate 600 shows the combinational logic to detect the example deadlock case shown in switch 10A in FIG. 11. The detection is based on the outputs of the SNAP SHOT REGISTER such as the signals ENABLE HI-PRI 12, etc. which define the multi-cast connections which have been made, and the WAIT signals which define the multi-cast connections which are trying to be made. In this case, gate 600 says that connections have been made from input port 1 to output port 2 and 4, and connections have been made from input port 4 to output port 1 and 3, but that deadlocked connections 1 to 3 and 4 to 2 are waiting to be made. The combinational logic in block 604 is composed of gates similar to gate 600 which detect all the other various combinations of 2, 3, and 4 connection multi-casts that can cause similar deadlock conditions between input ports 1 and 4. OR gate 602 performs a logical OR of all the possible type 1 deadlock conditions and generates a RESET IN1 & 4 signal that indicates that a type 1 deadlock has been detected between input ports 1 and 4. Logic similar to gates 600, 602, and 604 is used to detect deadlock conditions between every possible combination of the 4 input ports taken two at a time. The results are NOR'ed in gates like 606 and 608 which combine all the resets to the SNAP SHOT REGISTER associated with a given port. For instance, gate 606 combines the resets to all the SNAP SHOT REGISTER latches associated with input port 4; i.e., it controls the reset of a deadlock between input ports 1 and 4, 2 and 4, and 3 and 4. One additional input to gate 606 is included (IN4-REJECT) which is the correction reset for type 2 deadlock conditions. Thus the type 2 deadlock conditions cause the exact same correction algorithm to be implemented as is used for type 1 deadlock conditions. A correction signal like the output of gate 606 (NOT RESET IN4 HI-PRI) goes to AND gate 280 in the SNAP SHOT REGISTER logic of FIG. 9 and causes latch 284 to be reset. Latch 284 going to a zero causes signal ENABLE HI-PRI 41 and ENABLE HI-PRI 43 (not shown) to go to zero removing those conditions from gate 600. Thus, the deadlock condition is removed which causes gates 600 and 602 to go to zero and remove the deadlock correction signal (NOT RESET IN4 HI-PRI). Then normal operation may continue. Note that the type I deadlock detection and correction occurs completely within a single switch 10 apparatus and does not affect the other switches in the network in any manner or cause any change in the propagation of the multi-cast or broadcast operation across the network. The second deadlock condition, referred to as Type 2, occurs between two adjacent stages of a multi-stage network as illustrated in FIG. 11. One example of deadlock type 2 is shown which assumes that node 7 and 15 are trying to multi-cast simultaneously. Node 7 is multi-casting to switches 10E, 10F, and 10G, and is successful in winning the required connections in switches 10F, and 10G immediately as shown by the connecting lines in FIG. 11. However, node 7 is unable to successfully complete the multi-cast connection because it can not get a connections required in switch 10E. Node 15 is multi-casting to switches 10E, 10G, and 10H, and is successful in winning the required connections in switches 10E, and 10H immediately as shown by the connecting lines in FIG. 11. However, node 15 is unable to successfully complete the multi-cast connection because it can not get a connections required in switch 10G. Nodes 7 and 15 have become deadlocked and can never resolve the problem on their own. Node 7 has a connection to switch 10G that it will never release until it gets a connection to switch 10E, and node 15 has a connection to 10E that it will never release until it gets a connection to switch 10G. This problem is harder to solve than the type 1 deadlock, because it can span several or many switch chips in two adjacent network stages. The correction involves removing the inconsistent priorities that have been established in the stage 2 switches. Unfortunately, it is difficult to detect at the stage two switches because each individual switch has made what it thinks is a consistent priority decision, and it cannot detect that deadlock has occurred. The problem must therefore be detected by the stage 1 switch, which can detect that the multi-cast operation is not progressing the way it should be in the following stage. After stage 1 detects the problem it must issue a correction signal to the stage 2 switches that will cause them to reprioritize and eliminate the deadlock condition. Like the type 1 deadlock solution, the correction occurs without terminating or causing any change in the propagation of the multi-cast or broadcast operation across the network. The logic required to detect and correct type 2 deadlock conditions is shown in FIG. 13, and by way of example it can be assumed to be the logic contained entirely within the first stage switch 10D. However, the same logic is resident in every switch 10, regardless of the stage of the network, because for larger networks the stage 2 switches would be required to perform the same deadlock detection and correction functions in relation to the third stage switches.

The switch 10 D uses indications it receives back from the second stage switches over the OUTX-ACCEPT lines to detect the possible occurrence of deadlock type 2 conditions.

Figure 14A:
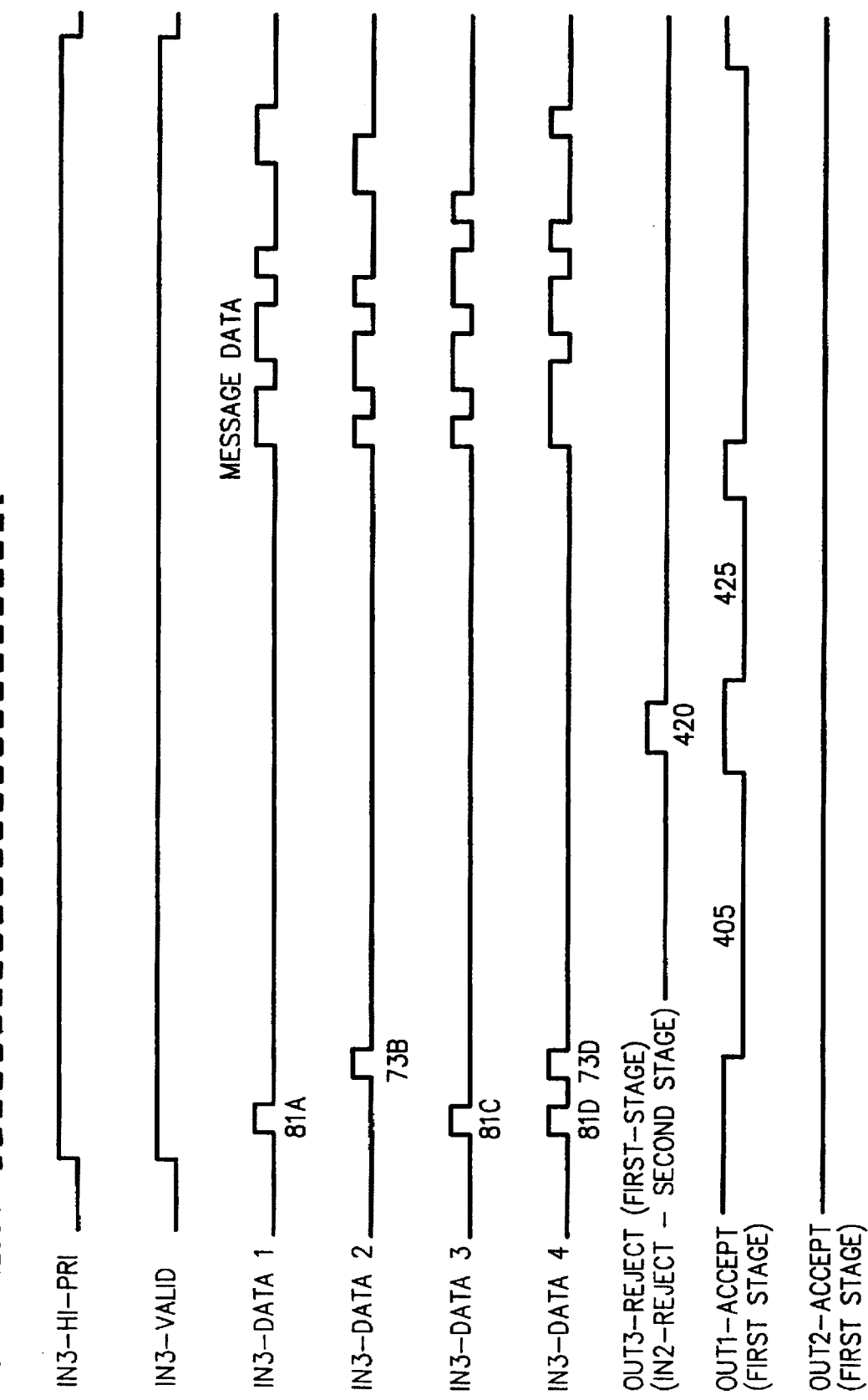

FIG. 14 shows the timing for the multi-cast operation from node 15 shown in FIG. 11 that has experienced a type 2 deadlock. The timing shows that the stage 1 connections in switch 10D are made easily and without any contention via the commands received on the pulses 81. Node 15 then receives pulse 71 on the INX-ACCEPT line from switch 10D informing it that all 3 stage 1 connections have been successfully established and cannot be broken for any reason, except a termination of the operation commanded by node 15. Node 15 then issues the 73 pulses to command connections to the second stage switches and pulse 75 goes to zero in response, which is a composite of the OUTX-ACCEPT pulses arriving from the 4 second stage switches and going to gate 102 of. FIG. 7. As each second stage switch makes its commanded connections it signifies success to the first stage switch 10D by raising it associated signal INX-ACCEPT signal, which is connected directly to the OUTX-ACCEPT signals of switch 10D. A zero on an OUTX-ACCEPT to switch 10D informs the first stage switch 10D that the commanded connections to be made in stage 2 via that stage 1 output port are pending and not successfully established. A one on an OUTX-ACCEPT to switch 10D informs the first stage switch 10D that the commanded connections to be made in stage 2 via that stage 1 output port have been successfully established.

Referring to FIG. 14, The OUT2-ACCEPT signal from stage 2 switch 10F stays at a logical one because there are no commanded connections to be made in switch 10F, and it therefore has completed making its commanded connections (none) as signified by OUT2-ACCEPT being a logical one. OUT3-ACCEPT completes its connection and specifies so by terminating pulse 407. OUT4-ACCEPT is shown to be slower, but it completes its connection and specifies so by terminating pulse 408. OUT1-ACCEPT can not make its connections in switch 10E because of deadlock type 2 conditions, and therefore pulse 405 is driven to zero and held there to indicate the required connections have not been made. Switch 10D implements a time-out detection of the type 2 deadlock. It begins a time-out count down after at least one output ports reports a successful connect and at least one output port reports an unsuccessful attempt.

FIG. 13 shows the typical logic used to detect the type 2 deadlock by monitoring the OUTX-ACCEPT lines; this logic is represented by block 546 in FIG. 7. Each OUTX-ACCEPT line is monitored by identical sets of logic shown typically by gates 104, 500, 506, and 508, and latches 502 and 504 for the purpose of monitoring OUT1-ACCEPT. 104 type gates (also shown in FIG. 7) enables only the monitoring of OUTX-ACCEPT signals which are presently involved in supporting valid connections. If there is a valid connection from input port 1 to output port 1, gate 1 will reproduce the waveform presented on OUT1-ACCEPT. When an OUTX-ACCEPT signal falls to indicate that a connection is pending in the following stage, latch 502 will be set to record the first such occurrence. Latch 502 is only permitted to set in the high priority mode of operation as specified by the ENABLE HI-PRI 11 signal into gate 500, which will hold latches 502 and 504 reset when there is no high priority operation being executed. Gate 506 detects the rise of the OUT1-ACCEPT signal indicating that the commanded connections have been made in the stage 2 switch 10E connected to output port 1 of the first stage switch. The first occurrence of the fall of OUT1-ACCEPT followed by the first rise causes latch 504 to set and to indicate that one switch in the next stage is done with the task of making its commanded connections. Note that this logic only functions for the first pulse on the OUT1-ACCEPT signal and that latches 502 and 504 will remain set in the normal case, so that the switch will only activate these latches once to detect deadlock in the very next stage. This logic is not active for subsequent stages of larger networks; i.e., a similar function in the stage 2 switch will detect type 2 deadlock conditions in stage 3, while the stage 1 deadlock detection logic remains dormant.

Gate 522 detects conditions where the one of the next stage switches has successfully established its connections as indicated by an active NEXT DONE 11 signal from latch 504, and some second stage switch has not yet established its connections successfully. This is detected by the OR of signals like NOT DONE 14 coming from gate 518, which indicates that a connection has been commanded between input port 1 and output port 4, but OUT4-ACCEPT has indicated that the connection has been made. OR gate 536 is the OR of all similar conditions to that detected by gate 522, but giving the status of the other output ports. Thus the output of OR gate 536 will go active during a high priority operation, if some of the connections in stage 2 of the network have been made and some haven't. The output of OR gate going active is delayed by block 540 and then used to start and enable the time-out counter 538.

Referring to FIG. 14 to relate the time-out counter to the deadlock timing diagram, in the example shown OUT3-ACCEPT goes away first by indicating successful connection to its second stage switch by the rise of pulse 407. At the rise of pulse 407, pulse 405 is still a zero; this meets the criteria that some second stage connections have been made and some are still pending. This detection starts the time-out counter 538 (as shown by pulse 409) through OR gate 536 and delay block 540. If the possible deadlock indication detected by gate 536 remains active for a specified length of time (as defined by the time-out counter), the suspicion is confirmed and the event is classified and detected to be a deadlock type 2 condition. This occurs in FIG. 13 when the TIME-OUT IN1 signal goes active indicating that the specified time interval has elapsed. The output from counter 538 is gated by the appropriate high priority enable signals in gates 541 to 544 to direct a correction signal to the output ports that are involved in the multi-cast or broadcast operation. The correction signal is send to all the second stage switches involved in the multi-cast or broadcast, whether they have successfully made connections or not. The correction signal is a pulse like 420 send over the OUTX-REJECT lines from the first stage 10D switch to the second stage switches which are presently connected to switch 10D. Pulse 420 is driven on to the OUTX-REJECT lines, which are otherwise unused during high priority set-up time. The path from gate 541 to the OUT1-REJECT signal coming from the Deadlock Type 2 Logic Block 546 is shown in FIG. 7. The reject pulse 420 to each second stage switch is received over the INx-REJECT line and routed to the Deadlock Type I Logic Block 548 as shown in FIG. 7. At the deadlock type I logic in the second stage, the INX-REJECT signals are NOR'ed with the deadlock type 1 cases in gates like 608. Thus, a deadlock type 2 indication is transmitted from the previous stage over the REJECT interface line connecting the two stages, and causes the second stage switch to reprioritize its high priority operations, just like a deadlock type 1 condition detected within its own switch would do. An internal deadlock correction signal, the output of gate 606 (NOT RESET IN4 HI-PRI) goes to AND gate 280 in the SNAP SHOT REGISTER logic of FIG. 9 and causes latch 284 to be reset. Thus, the deadlock condition is removed by reprioritizing the high priority operations, so that the priority will be consistent across the stage 2 switches.

The size of the 420 pulse issued on the OUTX-REJECT lines is controlled by the logic which generates the pulse. In FIG. 13 the output of gate 541 which generates and transmits pulse 420 is inverted by gate 550 and sent to AND gate 500, where it is used to reset latches 502 and 504 under the unusual condition of detecting a type 2 deadlock. Latch 504 being reset takes away the conditions from gates 522, 526, 530, and 534 which initially caused gate 536 to go active and enable the time-out. This disables the time-out counter 538 after the delay experienced by block 540, and causes pulse 420 to terminate. Thus, the delay block time is controls the pulse width for pulse 420. After the deadlock correction, latches 502 and 504 again look for the first occurrence of the corresponding OUT-ACCEPT pulses and begin to check again whether the connections will now be made correctly in the second stage. FIG. 14 shows via pulses 425, 427, and 428 that now the stage 2 connections are all established correctly and the MESSAGE DATA can be transferred in multi-cast fashion. Note that the conditions are present to to cause OR gate 536 to go active a second time and again start the time-out counter 538 to begin counting. However, this time the required connections are made before the counter 538 times out. The connections being made causes OR gate 536 to go to zero and to reset counter 538 before it times out.

FIGS. 7, 9, 12, and 13 show the typical circuit implementations required within the dual priority switch. Further replications of these functions are required to totally define all input ports as they each connect to all output ports. However, these implementations are an obvious extension of the figures shown and are not shown here.

Clearly, the inventions we have described by way of example of our preferred embodiments and in illustration of the best mode for practicing them provide a basis for much potential growth in the performance of switching networks for high speed data processing. Accordingly, it will be understood that those skilled in the art after reviewing our presently contemplated mode of practicing our inventions, both now and in the future, will envision further improvement and make enhancements and inventions without departing from the scope of the following claims which should be construed to protect and maintain the rights of the inventors in light of other developments.

What claimed is:

1. A multi-stage switch network comprising:

a plurality of switch apparatuses cascaded into a plurality of stages, said switch apparatuses each including a plurality of switch input ports and a plurality of switch output ports, of the switch output ports included on each of said switch apparatuses each coupled to a different one of the switch apparatuses via a switch input port of said different one of the switch apparatuses, switch output ports of last stage switch apparatuses each comprising a network output port and switch input ports of first stage switch apparatuses each comprising a network input port; and the network output ports each coupled to a network input port through one of a plurality of nodes, each of said nodes comprising means for receiving a data message from a coupled network output port, means for sending said data message to said coupled network input port, and means for selectively assigning a high priority to the data message to a coupled network input port, said data message to a coupled network input port including a path connection request;

said switch apparatuses each further including:
multicast means for establishing a multicast communication path between any one of the network input ports and any portion of the network output ports in response to a multicast path connection request received at said any one of the network input ports, said multicast communication path for transmitting a data message received at said any one of the network input ports simultaneously to said any portion of the network output ports;

broadcast means for establishing a broadcast communication path between said any one of the network input ports and all of the network output ports in response to a broadcast path connection request received at said any one of the network input ports, said broadcast communication path for transmitting the data message received at said any one of the network input ports simultaneously to said all of the network output ports;

asynchronous connection means for establishing asynchronously a plurality of concurrently active multicast communication paths, in response to a plurality of multicast path connection request received separately or simultaneously at a plurality of the network input ports, for transmitting concurrently a plurality of data messages received separately or simultaneously at said plurality of the network input ports each to a portion of the network output ports;

wherein the asynchronous connection means includes:
means for establishing asynchronously, in response to a plurality of connection requests received separately or simultaneously at said plurality of the network input ports, a plurality of concurrently active point-to-point communication paths, or point-to-point and multicast communications paths,
said plurality of concurrently active point-to-point communication paths, or point-to-point and multicast communications paths for trasmitting concurrently a plurality of data messages received separately for simultaneously at said plurality of the network input ports to a plurality of the network output ports;

detecting means for detecting a contention for one or more busy switch output ports by multiple broadcast or multicast messages;

pending means for maintaining all path connections established by said multiple broadcast or multicast messages contending for one or more busy switch input ports, and for stacking, prioritizing, and servicing said multiple broadcast or multicast messages one at a time when the requested busy switch output ports become available connection means for establishing a point-to-point communication path between said any one of the network input ports any one of the network output ports in response to a point-to-point connection request received at said any one of the network input ports, said point-to-point communication path for transmitting a data message received at said any one of the network input ports to said any one of the network output ports; and wherein said point-to-point, multicast, and broadcast communication paths each include a plurality of signal lines for signaling back to a sending node:
a wait signal when the detecting means detects the one or more busy switch outputs requested by the high priority data message;
a reject signal when the detecting means detects the one or more busy switch outputs requested by a non-high priority data message, the reject signal indicating to the sending node that the non-high priority data message must be tried either as a non-high priority data message again or as a high priority data message;
a continue signal when the pending means establishes the high priority communication path requested by the high priority data message through the one or more busy switch outputs when they become available; and
an acceptance signal when a data message transmitted over said point-to-point, multicast, or broadcast communication paths has been successfully received by one or more receiving nodes.

2. A multi-stage switch network comprising:
a plurality of switch apparatuses cascaded into a plurality of stages, said switch apparatuses each including a plurality of switch input ports and a plurality of switch output ports, of the switch output ports included on each of said switch apparatuses each coupled to a different one of the switch apparatuses via a switch input port of said different one of the switch apparatuses, switch output ports of last stage switch apparatuses each comprising a network output port and switch input ports of first stage switch apparatuses each comprising a network input port; and the network output ports each coupled to a network input port through one of a plurality of nodes, each of said nodes comprising means for receiving said data message from a coupled network output port, means for sending said data message to said coupled network input port, and means for selectively assigning a high priority to the data message to a coupled network input port, said data message to a coupled network input port including a path connection request;

said switch apparatuses each further including:
multicast means for establishing a multicast communication path between any one of the network input ports and any portion of the network output ports in response to a multicast path connection request received at said any one of the network input ports, said multicast communication path for transmitting a data message received at said any one of the network input ports simultaneously to said any portion of the network output ports:

broadcast means for establishing a broadcast communication path between said any one of the network input ports and all of the network output ports in response to a broadcast path connection request received at said any one of the network input ports, said broadcast communication path for transmitting the data message received at said any one of the network input ports simultaneously to said all of the network output ports;

asynchronous connection means for establishing asynchronously a plurality of concurrently active multicast communication paths, in response to a plurality of multicast path connection requests received separately or simultaneously at a plurality of the network input ports, for transmitting concurrently a plurality of data messages received separately or simultaneously at said plurality of the network input ports each to a portion of the network output ports;

detecting means for detecting a contention for one or more busy switch output ports by multiple broadcast or multicast messages;

pending means for maintaining all path connections established by said multiple broadcast or multicast messages contending for one or more busy switch input ports, and for stacking, prioritizing, and servicing said multiple broadcast or multicast messages one at a time when the requested busy switch output ports become available; and type 1 deadlock means for allowing one of a plurality of broadcast and multicast data message path connection requests for one or more same switch output ports to be established, while others of said plurality of broadcast and multicast data message path connection requests are passed to the pending means and assigned the high priority.

3. A multi-stage switch network comprising:

a plurality of switch apparatuses cascaded into a plurality of stages, said switch apparatuses each including a plurality of switch input ports and a plurality of switch output ports, of the switch output ports included on each of said switch apparatuses each coupled to a different one of the switch apparatuses via a switch input port of said different one of the switch apparatuses, switch output ports of last stage switch apparatuses each comprising a network output port and switch input ports of first stage switch apparatuses each comprising a network input port; and the network output ports each coupled to a network input port through one of a plurality of nodes, each of said nodes comprising means for receiving a data message from a coupled network output port, means for sending a data message to a coupled network input port, and means for selectively assigning a high priority to the data message to a coupled network input port, said data message to a coupled network input port including a path connection request;

said switch apparatuses each further including:

multicast means for establishing a multicast communication path between any one of the network input ports and any portion of the network output ports in response to a multicast path connection request received at said any one of the network input ports, said multicast communication path for transmitting a data message received at said any one of the network input ports simultaneously to said any portion of the network output ports;

broadcast means for establishing a broadcast communication path between said any one of the network input ports and all of the network output ports in response to a broadcast path connection request received at said any one of the network input ports, said broadcast communication path for transmitting the data message received at said any one of the network input ports simultaneously to said all of the network output ports;

asynchronous connection means for establishing asynchronously a plurality of concurrently active multicast communication paths, in response to a plurality of multicast path connection requests received separately or simultaneously at a plurality of the network input ports, for transmitting concurrently a plurality of data messages received separately or simultaneously at said plurality of the network input ports each to a portion of the network output ports;

detecting means for detecting a connection for one or more busy switch output ports by multiple broadcast or multicast messages; and pending means for maintaining all path connections established by said multiple broadcast or multicast messages contending for one or more busy switch input ports, and for stacking, prioritizing, and servicing said multiple broadcast or multicast messages one at a time when the requested busy switch output ports become available; and type 2 deadlock means for detecting a possible 2 deadlock condition encountered by a plurality of multicast or broadcast data messages' path connection requests in a succeeding stage of the network, and for issuing a reprioritizing signal only to switch apparatuses in the succeeding state having switch output ports requested by said plurality of multicast or broadcast data messages' path connection requests, the reprioritizing signal triggering a type 1 deadlock means included in said switch apparatuses in the succeeding stage for allowing one of said plurality of multicast or broadcast data messages' path connection requests to be established.

4. A switch network comprising:

a switch apparatus including a plurality of switch input ports and a plurality of switch output ports; and said switch output ports each coupled to a switch input port, through one of a plurality of nodes, each of said nodes comprising means for receiving a data message from a coupled switch output port, means for sending a data message to a coupled switch input port, and means for selectively assigning a high priority to the data message to a coupled switch input port, said data message to a coupled switch input port including a path connection request;

said switch apparatus further including:

multicast means for establishing a multicast communication path between any one of the switch input ports and any portion of the switch output ports in response to a multicast path connection request received at said any one of the switch input ports, said multicast communication path for transmitting a data message received at said any one of the switch input ports simultaneously to said any portion of the switch output ports;

broadcast means for establishing a broadcast communication path between said any one of the switch input ports and all of the switch output ports in response to a broadcast path connection request received at said any one of the switch input ports, said broadcast communication path for transmitting the data message received at said any one of the switch input ports simultaneously to said all of the switch output ports;

asynchronous connections means for establishing asynchronously a plurality of concurrently active multicast communication paths, in response to a plurality of multicast path connection requests received separately or simultaneously at a plurality of the switch input ports, for transmitting concurrently a plurality of data messages received separately or simultaneously at said plurality of the switch inputs each to a portion of the switch output ports;

detecting means for detecting a contention for one or more busy switch output ports by a data message having a path connection request for the one or more busy switch output ports;

pending means for maintaining all path connections established for a high priority data message path connection request and for establishing a high priority communication path requested by the high priority data message through the one or more busy switch output ports when they become available; and priority means for determining by a rotating priority protocol which high priority data message contending for the one or more busy switch output ports and having path connections maintained by the pending means will have its requested high priority communication path established next by the pending means, if there is more than one such high priority data message contending for the one or more busy switch output ports and having path connections maintained by the pending means; and deadlock means for allowing one of a plurality of broadcast and multicast data message path connection requests for one or more same switch output ports to be established, while others of said plurality of broadcast and multicast data message path connection requests are passed to the pending means and assigned the high priority.

5. A network switch comprising:

a plurality of switch input ports and a plurality of switch output ports;

multicast means for establishing a multicast communication path between any one of the switch input ports and any portion of the switch output ports in response to a multicast path connection request received at said any one of the switch input ports, said multicast communication path for transmitting a data message received at said any one of the switch input ports simultaneously to said any portion of the switch output ports;

broadcast means for establishing a broadcast communication path between said any one of the switch input ports and all of the switch output ports in response to a broadcast path connection request received at said any one of the switch input ports, said broadcast communication path for transmitting the data message received at said any one of the switch input ports simultaneously to said all of the switch output ports;

asynchronous connection means for establishing asynchronously a plurality of concurrently active multicast communication paths, in response to a plurality of multicast path connection requests received separately or simultaneously at a plurality of the switch input ports, for transmitting concurrently a plurality of data messages received separately or simultaneously as said plurality of the switch input ports each to a portion of the switch output ports;

detecting means for detecting a contention for one or more busy switch output ports by multiple broadcast or multicast messages; and pending means for maintaining all path connections established by said multiple broadcast or multicast messages contending for one or more busy switch input ports, and for stacking, prioritizing, and servicing said multiple broadcast or multicast message one at a time when the requested busy switch output ports become available;

priority means for determining by a rotating priority protocol which data message contending for the one or more busy switch output ports and having path connections maintained by the pending means will have its requested communication path established next by the pending means, if there is more than one such data message contending for the one or more busy switch output ports and having path connections maintained by the pending means; and deadlock means for allowing one of a plurality of broadcast and multicast data message path connection requests for one or more same switch output ports to be established, while other of said plurality of broadcast and multicast data message path connection requests are passed to the pending means and assigned the high priority.

* * * * *